(12) United States Patent
Whittaker et al.

(10) Patent No.: US 7,069,124 B1
(45) Date of Patent: Jun. 27, 2006

(54) ROBOTIC MODELING OF VOIDS

(75) Inventors: William Lawrence Whittaker, Pittsburgh, PA (US); Warren Charles Whittaker, Pittsburgh, PA (US); Scott Mason Thayer, Pittsburgh, PA (US); Zachary Meyer Omohundro, Pittsburgh, PA (US); Carlos Felipe Reverte, Pittsburgh, PA (US); David Ian Ferguson, Pittsburgh, PA (US); Aaron Christopher Morris, Pittsburgh, PA (US); Christopher Baker, Crafton, PA (US)

(73) Assignee: Workhorse Technologies, LLC, West Homestead, PA (US)

( * ) Notice: Subject to any disclaimer, the term of this patent is extended or adjusted under 35 U.S.C. 154(b) by 95 days.

(21) Appl. No.: 10/696,669

(22) Filed: Oct. 28, 2003

Related U.S. Application Data

(60) Provisional application No. 60/421,661, filed on Oct. 28, 2002.

(51) Int. Cl.
    *G01V 3/38* (2006.01)
(52) U.S. Cl. ............................................. 701/28; 702/5
(58) Field of Classification Search ................ 702/1–8; 701/28, 50, 207, 25; 382/104, 153; 356/606; 324/326; 700/244, 245
See application file for complete search history.

(56) References Cited

U.S. PATENT DOCUMENTS

| | | | | |
|---|---|---|---|---|
| 1,421,887 A | * | 7/1922 | Allan | 114/52 |
| 3,713,329 A | * | 1/1973 | Munger | 600/451 |
| 4,884,847 A | * | 12/1989 | Bessinger et al. | 299/1.05 |
| 5,155,775 A | * | 10/1992 | Brown | 382/153 |
| 5,274,437 A | * | 12/1993 | Hornyik | 356/606 |
| 5,493,499 A | * | 2/1996 | Theurer et al. | 701/207 |
| 5,999,865 A | * | 12/1999 | Bloomquist et al. | 701/25 |
| 6,009,359 A | | 12/1999 | El-Hakim et al. | 701/28 |
| 6,055,214 A | * | 4/2000 | Wilk | 367/99 |
| 6,333,631 B1 | * | 12/2001 | Das et al. | 324/326 |

(Continued)

FOREIGN PATENT DOCUMENTS

CA    EP 0952427 A2 * 10/1999

(Continued)

*Primary Examiner*—Bryan Bui
*Assistant Examiner*—Victor J. Taylor
(74) *Attorney, Agent, or Firm*—Reed Smith LLP

(57) ABSTRACT

Robotic systems for modeling, mapping and exploring subterranean void spaces such as mines, caves, tunnels, bunkers, and conduits. Robotic modeling of subterranean voids is generally enabled by a procedural system consisting of preprocessing, ingress, void modeling, mapping and navigation, exploration, conveying payloads other than void modeling sensors, egress, and post processing. The robots can either be imposed mobility or can be self mobile with either autonomous, remote, teleoperated, or manual modes of operation. The robot may optionally transform from a compact size into a more conventional operating size if the operating size exceeds the void entry opening size. Void geometries with flat floors are amenable to robot locomotion such as rolling, crawling, walking or swimming. Alternatively, irregular floor geometries that preclude self mobilization may be accessible by imposed mobilization such as dropping or pushing a movable robotic sensor into such voids. The robotic device is preferably adaptable to voids filled with a gas or liquid. To maximize mapping applicability, the robot optionally includes sensing, locomotion and environmental tolerance to submersion and safeguarding, according to use criteria.

21 Claims, 20 Drawing Sheets

U.S. PATENT DOCUMENTS

| | | | |
|---|---|---|---|
| 6,349,249 B1 * | 2/2002 | Cunningham | 701/28 |
| 6,405,798 B1 | 6/2002 | Barrett et al. | 166/250.01 |
| 6,442,476 B1 * | 8/2002 | Poropat | 701/207 |
| 6,446,718 B1 | 9/2002 | Barrett et al. | 166/250.01 |
| 6,463,374 B1 * | 10/2002 | Keller et al. | 701/50 |
| 6,535,793 B1 * | 3/2003 | Allard | 700/259 |
| 6,608,913 B1 * | 8/2003 | Hinton et al. | 382/104 |
| 2003/0216834 A1 * | 11/2003 | Allard | 700/245 |

FOREIGN PATENT DOCUMENTS

JP    591017261 A2 * 10/1999

* cited by examiner

ROBOTIC MODELING OF VOIDS

CLAIM OF PRIORITY

This application claims priority to U.S. Provisional Patent Application Ser. No. 60/421,661 filed on Oct. 28, 2002.

BACKGROUND OF THE INVENTION

1. Field of the Invention

The present invention relates generally to the robotic mapping of voids, and more particularly, the present invention relates to robotic devices capable of navigating and mapping voids in two or three dimensions and methods for deploying the robots, generating and capturing mapping data, and post processing the map data into usable formats.

2. Description of the Background

In many different fields of endeavor, it is highly desirable to discern the internal features of hollow, or partially hollow structures. These hollow structures, referred to herein as "voids" take on a variety of different common forms. Examples of voids include stand-alone discrete structures such as tanks and bunkers, man-made subterranean structures such as pipes (e.g., sewer pipes) and tunnels, and natural or dug structures such as caves and mines.

Often, the internal features of these structures are not accessible for observation by humans or by conventional technologies. For example, a bunker or storage facility may include residual or active radiological (e.g., nuclear) material that could harm a human surveyor. Further, some voids, such as mines or caves may be unsafe for human exploration because of past or imminent collapses. Additionally, some voids, such as sewer pipes may be too small for conventional surveying methodologies.

In the past, the mapping of the internal features of these and other voids has been attempted from the outside, via some type of penetrating technology, such as radar mapping. Many different technologies have been tried, to varying degrees of success, but none approach the resolution desired to produce useful internal maps.

The maps of the internal structures of various voids are useful for a variety of different reasons. Its use for mines is well documented and will be used as an example throughout this specification.

The mining of ores from the earth is an ancient process, having been practiced from prehistoric times. With the passage of time, mining became more widespread and technology evolved to allow mines to become ever longer and to go more deeply into the ground. It is now commonplace for a single mine to have many miles of excavated corridors.

When an ore of value is discovered in one place, there is often a high probability that either the seam of ore will continue from beneath one parcel of real estate to another, or that another seam of the same ore will be located under a plot of land that is near to where the original seam was discovered. It is therefore very common for numerous mines to be located in relatively close proximity to one another.

Once the valuable ores have been removed from a mine, it is almost never economically feasible or technically viable to refill the excavated void. As a result, mines that are below water table frequently fill up with water over the course of years, or toxic gasses can seep from the surrounding geology into the void. Quite frequently, the old mine shafts are used for the disposal of materials that are no longer wanted. Abandoned mines therefore are quite hazardous and governmental regulation attempts to minimize the likelihood that the construction of a new mine will intersect an existing mine and allow the potentially hazardous contents of the older mine to intrude into the newer one. The result of inadvertent breach from one mine into another is likely to be disastrous, with frequent loss of not only significant investment but also of human life.

In order to ensure that new mines do not penetrate into existing mines, the government generally requires that the excavator of the new mine obtain a permit before any excavation can begin. Part of the process of obtaining a permit for digging a new mine includes demonstrating that the proposed new mine will not intersect an existing mine. This is accomplished primarily by inspecting copies of existing maps of all mines in the area surrounding the proposed new mine and planning the layout of the new mine so that there is a safe distance between the new mine and any pre-existing mine.

A major problem with this scheme is that the maps of existing mines are frequently inaccurate or incomplete. Given this situation, even with the best possible planning the excavator of a new mine is frequently unable to completely ensure that the new mine will not intersect with a pre-existing mine. As a result, the excavator of a new mine in effect gambles that the maps of existing mines are accurate. In such situations, the inaccuracy of old maps is usually not realized until disaster has already struck.

In addition, due to the danger, expense, and regulation against human entry, it is not feasible to re-inspect abandoned mines by human means and so there is currently no way to validate maps that purport to show the layout of existing mines.

Compounding this situation is that fact that even if maps that were once accurate are available, coalfields are vulnerable to breaches, inundations and collapses. Submergence, roof fall, rotted timbers and water seals prevent human access for remapping and there is frequently no safe way to determine if such changes in the configuration of closed mines have occurred.

Given this state of affairs, it is apparent that there is a substantial and unmet need to generate accurate and complete maps of mines and other voids, even if those mines are no longer in use. One means of addressing this need is the development of robots that are capable of inspecting the internal features of a void and of obtaining data so that a precise map of existing conditions could be generated. Use of a robot for this work has several advantages over competing technologies. For example, the physical presence by a robot inside underground cavities is proof of the existence of void at that location. The direct observation of the surface of an internal cavity is superior to complementary approaches (e.g., ground penetrating radar or seismic technique) that only make inference from external observation.

Use of robotics for mapping mines offers the possibility of generating survey quality mapping of those mines, as opposed to the results of competing technologies which only provide approximations of the location of voids which may or may not be mines. Not only would a two-dimensional (2D) layout of the mine be obtainable from the use of such robots, but such robotics could model three-dimensional (3D) surfaces such as the roof, walls and floors of such a mine. In addition, small robots would be capable of accessing confined voids that might be completely undetectable by complementary approaches.

Some work in the development of mine mapping robots was performed at Carnegie Mellon University in the early 1990's. For example, early attempts at mine mapping (circa 1993) included a robot developed by some of the present inventors which mapped and navigated a portion of a coal mine. In this experiment, local navigation software and acoustic sensing was integrated with a composite model builder. The robot traversed a short piece of the mine mapping the walls and creating a network of goal positions.

Subsequent experiments with the same robot included using data from a scanning laser range finder and making turning decisions based on its internally generated map. This early robot had both an under-powered onboard computer and such a large power consumption as to be unfeasible for practical work. It also was not capable of working in water- or explosive gas-filled environments.

Other researchers have also investigated the use of robots in mines and wells. For example, U.S. Pat. No. 4,884,847 discloses a vehicle equipped with numerous types of sensors to create maps of mines. The vehicle is guided remotely, and a data link such as a fiber optic cable is used to transmit data back to a computer located outside the mine. However, that robot can not be used to generate a map of a mine by itself; in fact, the disclosure specifically states (at col. 3, line 5) that "accurate entry maps and profiles will probably not be developed by simple deduction from the instrument data; rather, a more complex, knowledge-based algorithm will be required." In other words, some further interpretation of the data, presumably by a human, will be needed to actually generate a map of the mine.

U.S. Pat. No. 6,405,798, and U.S. Pat. No. 6,446,718 (a continuation thereof), both pertain to an autonomous vehicle which can be used to inspect conditions within an oil well, perhaps utilizing high frequency sonar and a video camera. Nothing in this disclosure refers to mapping the internal features of the well (void).

Finally, U.S. Pat. No. 6,009,359 addresses the need for a robot to map an unknown indoor environment such as an underground mine tunnel. The disclosed invention is limited to the use of a plurality of sensors that are located a known distance from one another. From the overlap and intensity of the images, the robot can calculate the distance between itself and the walls of the enclosed environment. The technology disclosed in this patent is limited to the process of generating maps from stereoscopic images. In addition, the patent does not give any indication of how to make the invention work in a possibly turbid environment which may be partially or completely filled with a liquid such as water and in which diffraction or attenuation of light would significantly degrade mapping performance. Further, the robot described in that patent requires that access to the void be at least as large as the size of the robot; no provision is made for the robot entering the mine through a small borehole and subsequently expanding into a larger, more useful configuration.

As such, there is a need in the art to provide a self-contained, autonomous robot capable of generating a map on its own or to plot a course through and around a void without direct human supervision. The present invention, in at least one preferred embodiment, addresses one or more of the above-described and other limitations to prior art systems.

SUMMARY OF THE INVENTION

In accordance with at least one preferred embodiment, the present invention provides robotic systems for modeling, mapping and exploring subterranean void spaces such as mines, caves, tunnels, bunkers, and conduits. Robotic modeling of subterranean voids is enabled by a procedural system consisting of preprocessing, ingress, void modeling, mapping and navigation, exploration, conveying, payloads other than void modeling sensors, egress, and post processing.

Attributes of the voids such as void entry restriction, void amenability to robot motion, and void content determine the classes of robot manifestations that are relevant to modeling within respective void types. Such robots can either be imposed mobility or can be self mobile with either autonomous, remote, teleoperated, or manual modes of operation. Robots whose operating size exceeds the void entry opening size preferably stow into compact form for ingress and egress, and expand into larger size during operation.

Void geometries like mine corridors with flat floors are amenable to robot locomotion such as rolling crawling, walking or swimming. Alternately floor geometry might be so irregular as to preclude common means of self locomotion. Geometries that preclude self mobilization are still accessible by imposed mobilization such as dropping or pushing a robotic sensor into such voids. Finally, although voids are typified as vacancies without content, mine voids are gas or liquid filled. This distinction is important to robotic sensing, locomotion and environmental tolerance to submersion and safeguarding, all of which are accounted for in the present invention.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

Figure 1:
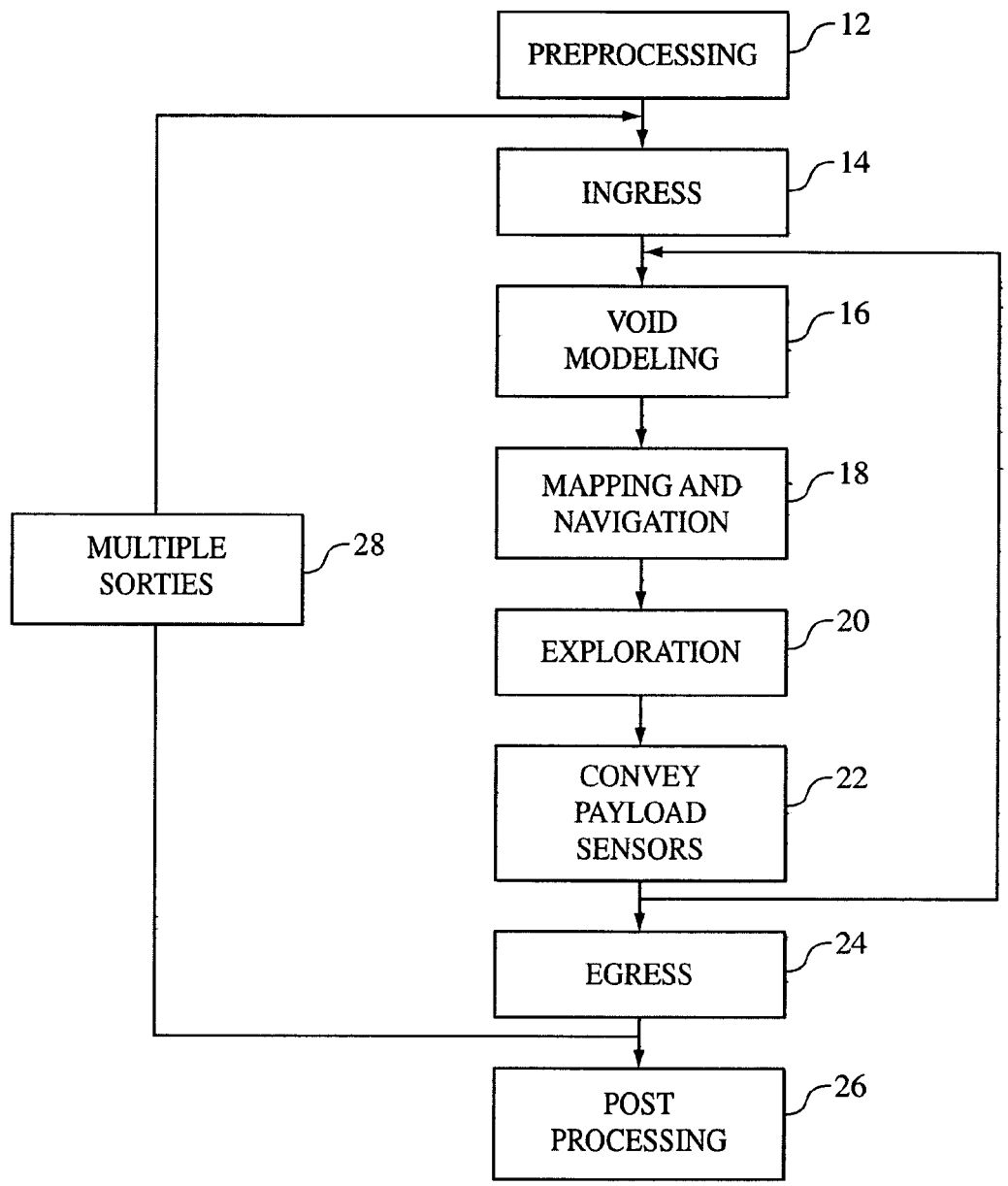
FIG. 1 shows the basic robotic void mapping methodology.

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

In at least one preferred embodiment, the present invention comprises devices and methods for entering a void, navigating through and mapping the internal features of the void, egressing from the void, and post processing the acquired mapping data into a variety of useful formats. A variety of different devices with many optional features suited to different environments and topologies may be used within the scope of the present invention. However, the general process steps remain similar for all mapping operations. Therefore, before specific devices and device features are explained in more detail, the general mapping process will be explained immediately below.

Void Mapping Methodology

The general procedure for the robotic mapping of voids, subterranean or otherwise, includes the ability to position the mapping robot within the void (at least to the extent necessary to acquire data), acquiring the mapping data for a portion of the void, removing the mapping robot from the void, and processing the acquired map data to produce some usable map of the void (e.g., a three-dimensional map of the internal features of the void). Generally speaking, the steps in this procedure, some of which are optional as described below, can be broken down into the following subprocesses (FIG. 1): preprocessing 12, ingress/deployment 14, void modeling 16, mapping and navigation 18, exploration 20, conveying payloads other than void modeling sensors 22, stowing/egress 24, and post processing 26. Each of these subprocesses is explained in more detail below followed by a description of exemplary void mapping robots.

Preprocessing

Preprocessing 12 is the means by which robotic systems are tailored to expected conditions in order to maximize successful void modeling 16. This includes the selection of different characteristics and features of the robot itself, as well as acquiring existing data about the void and preparing to collect data in a format that will be useful for eventual post processing. For example, in a mine mapping application, the existing information may be in the form of maps, physical data, visible subsidence, wells, geology, history, geophysical techniques and the like. Forming an operational plan to optimize the intended route, guidance behavior and choice of robot systems for a given procedure is an iterative process, and, as more information is gained about a specific void, the operational plan is updated.

Ingress/Deployment

The ingress/deployment step 14 is the general description given to the process by which the void mapping robot is inserted at least partially within the void (ingress), as well as, if necessary, preparing the void mapping robot to collect data about the internal features of the void (deployment). The void mapping robot may gain access to the inside of the void in a variety of different ways, including travelling through drill holes, openings, or portals. As described in more detail below, some of these techniques merely require the robot to "walk" or roll into a large opening in the void (e.g., the entrance or portal of a mine) while others require the robot to be inserted (under its own power or via an external mobility source into the void. In some applications, the robot is completely inserted into the void, while in others (e.g., FIG. 17) only a sensor or other component is inserted therein (the robot anchoring itself to the walls of a drillhole).

Deployment readies the robot for navigating the interior of the void and/or collecting data about the internal surface of the void. For example, some classes of robots must stow prior to ingress/egress in order to fit through the constraints of the access (a small diameter drill hole). During deployment, these stowed robots then "transform" once inside the void into a deployed configuration in order to operate. More generally, deployment transformation typically includes extending sensors, stabilizers, and/or locomotive components on the robot.

In some embodiments, the void mapping robot may even consist of a docking station with a removable data collection robot that mates with the docking station. Ingress, therefore, would include the process of getting the data collection robot and docking station into the interior of the void, and deployment would include undocking the data collection robot from the docking station. The docking station preferably provides a homing beacon, communications, recharging ability, and/or remote observation services for the data collection robot(s).

Void Modeling

Figure 14A:
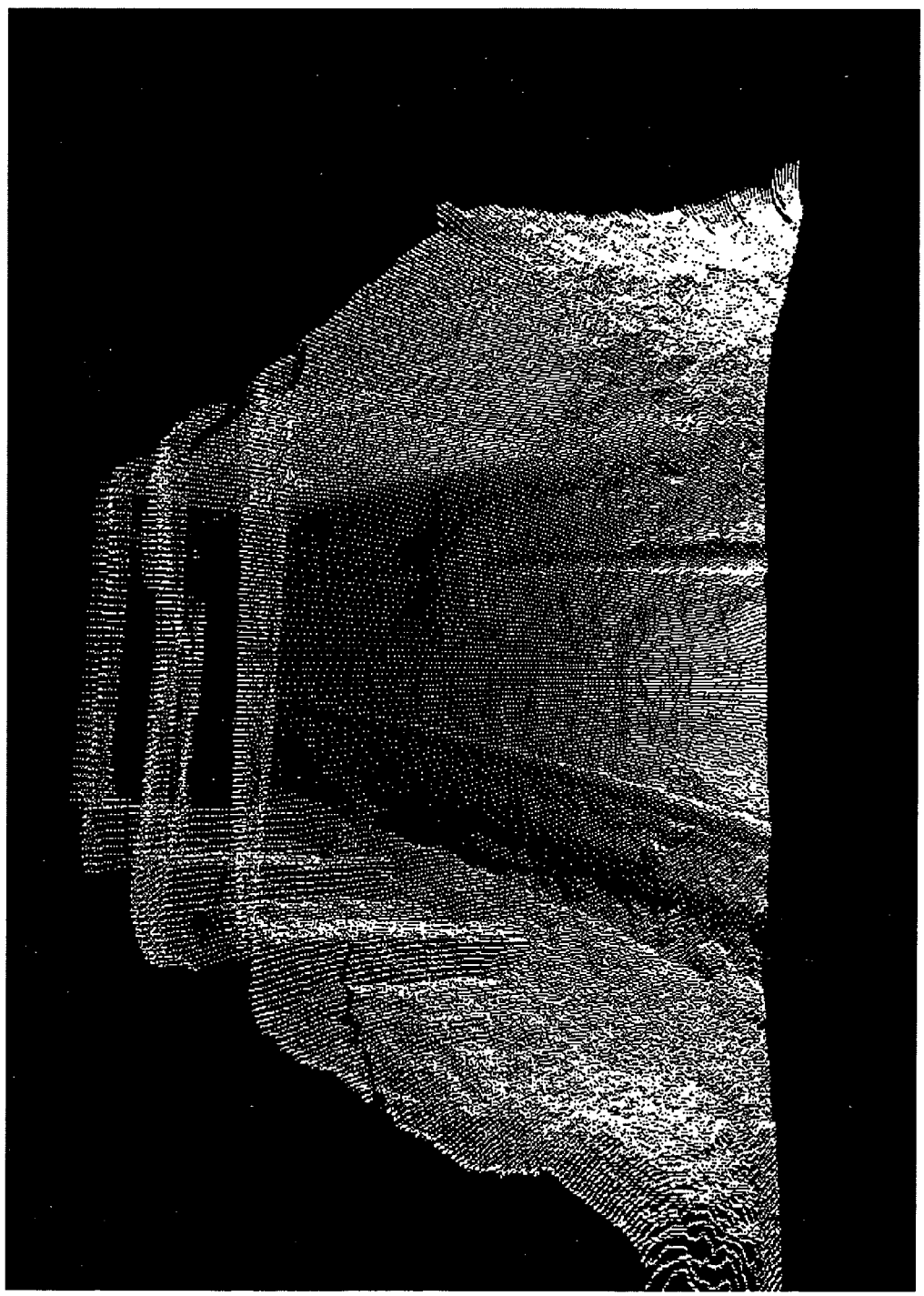
FIG. 14 shows void mapping robot scans including local scans (14A, 14B, 14C) and combined map image (14D)
Figure 14B:
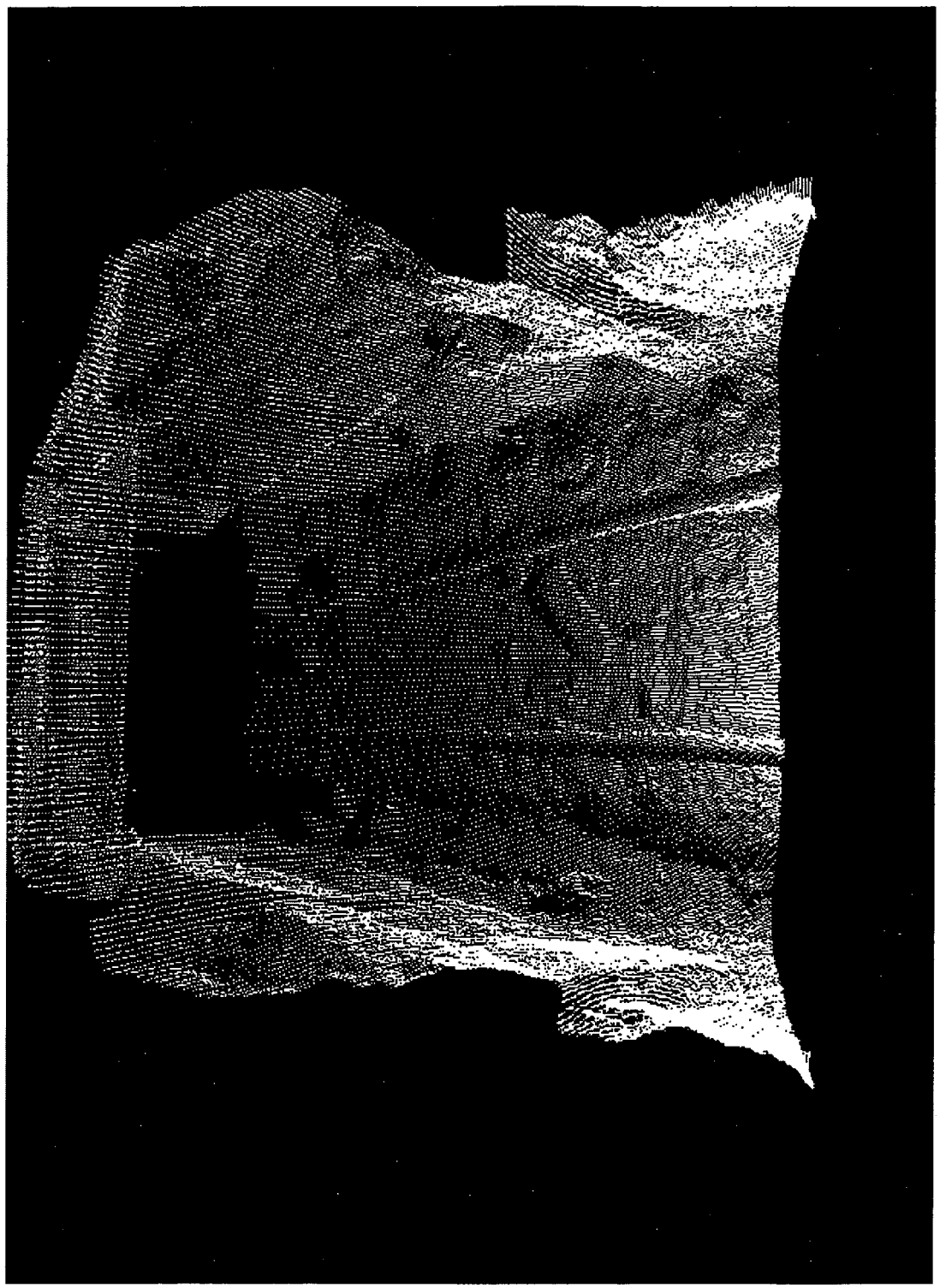
Figure 14C:
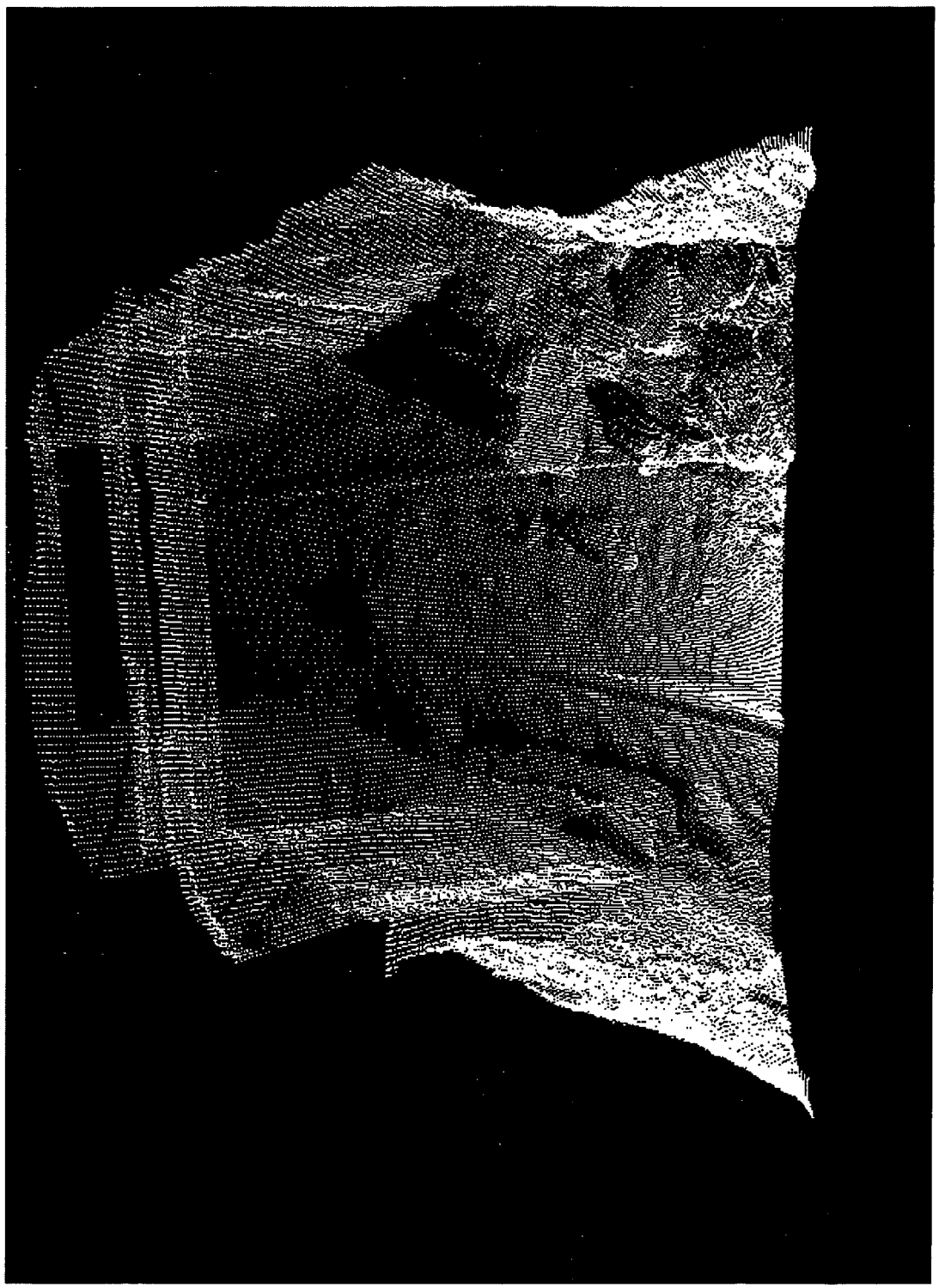

Void modeling 16 is the robotic generation of a geometric void description. Void models are robotically generated by accessing voids, sensing, moving within voids, exiting voids, and post processing. Means utilized for void mapping include orienting range sensors, gathering range data, and correlating range data to sensor position and orientation. Void modeling includes the means to combine data and knit local range models from multiple sensors (FIGS. 14A, 14B, and 14C) into a composite void model (e.g., FIG. 14D) (as described below).

Mapping and Navigation

Mapping and Navigation 18 includes the process by which a current route is mapped and a future route is determined. Navigation is the process which plans and moves a robot within the map in order to obtain a new position for sensing and extending the map. Navigation may occur manually as directed by an operator or may occur autonomously. Autonomous navigation uses the mapping and sensing data along with the exploration plan (20) in order to choose and execute a robot's next move.

Based on the sensors, a robot position is continuously updated into the map as the robot is moving in order to assure reaching a navigation goal. Network following is a mobile means for exploration, navigation, and mapping a network of subterranean voids. Network following includes determination and reconciliation of intersections and loops that revisit previously traversed locations. Loop closure algorithms realign and correct void network geometry. Robots are guided in a plan that maximizes network loop closure which results in higher reliability void models.

Mobility refers to the autonomous, remote, teleoperated, and manual modes of moving a robot through the subterranean void in order to achieve range gathering goals. Autonomous robot mobility is the command output of a software program that automatically commands movement of robots. Remote robot mobility is a direct manual interface that moves robots. Teleoperation involves commanding robots to move to a new location in order to extend exploration of the void. Manual mobility modes refer to hand-deploying imposed mobility robots to another location to generate a new pose for scanning a void. Remote, teleoperation and manual deployment moves are operator-controlled decisions.

Exploration

Exploration 20 (FIG. 1) refers to robotic planning, behavior and constraints that govern operational intent. Exploration 20 implements these forms of guidance that pertain to decisions above the level of local void modeling and navigation, to accomplish robotic intentions like perimeter-finding, route-following or corridor traverse. Unique exploration intentions can utilize the same capabilities of a robot and the same means of mapping and navigation to achieve very different operational intentions.

Figure 3:
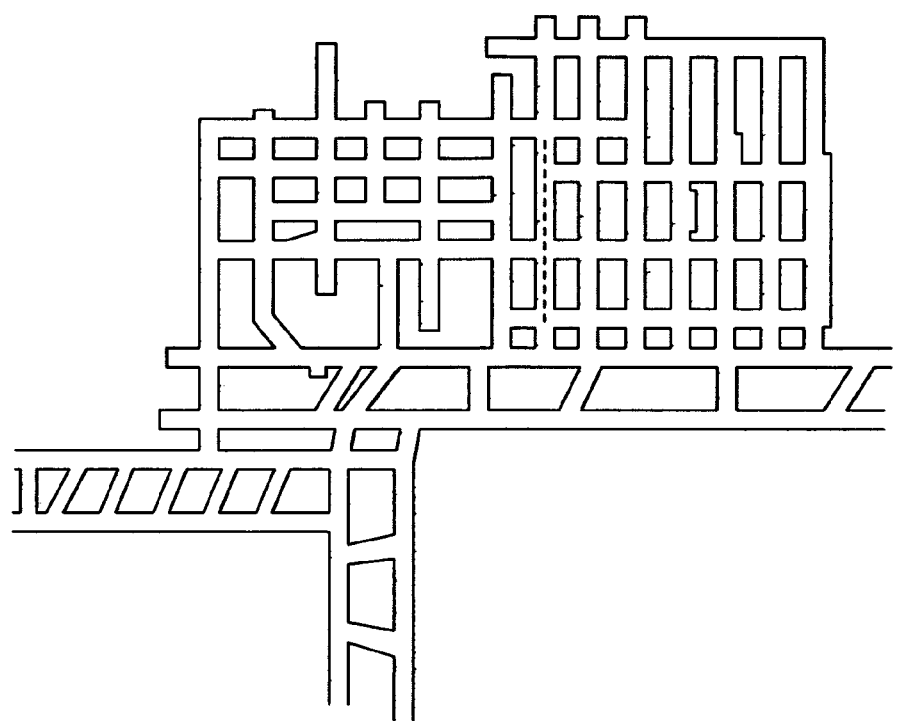
FIG. 3 shows an existing mine map.
Figure 4A:
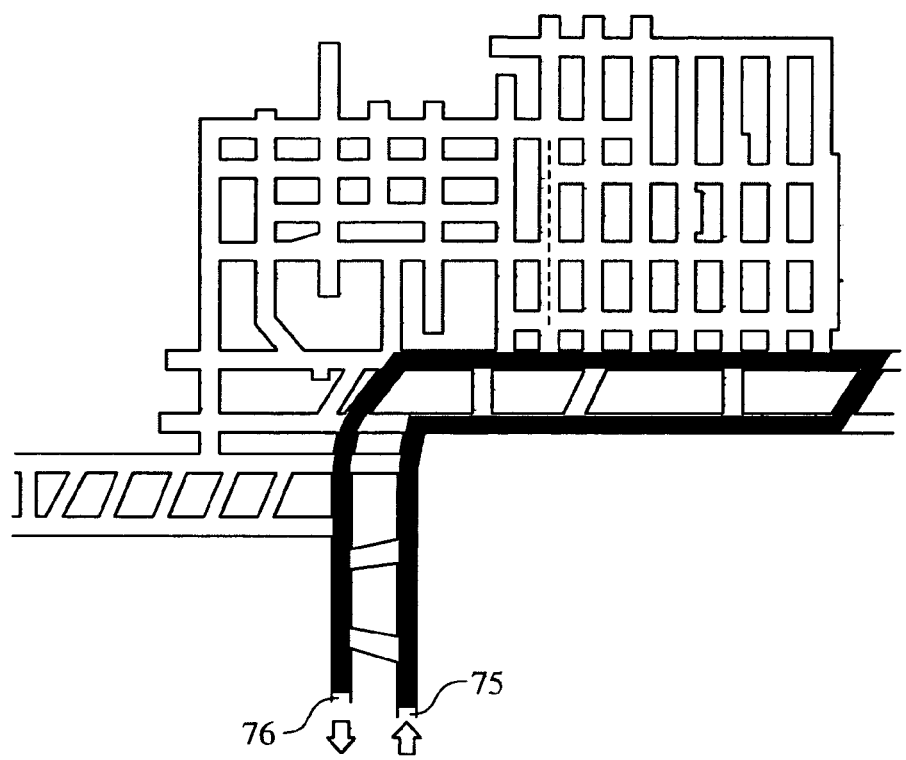
FIG. 4 details various mobility plans including dual portion (4A), path blockage (4B), multiple sorties (4C) and perimeter (4D)
Figure 4B:
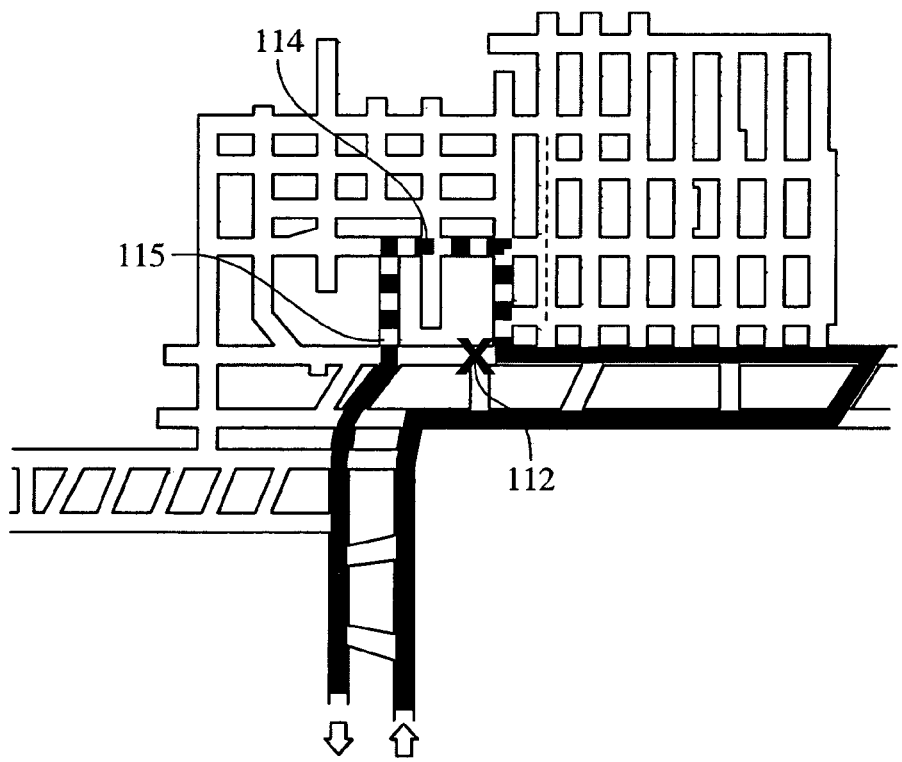
Figure 4C:
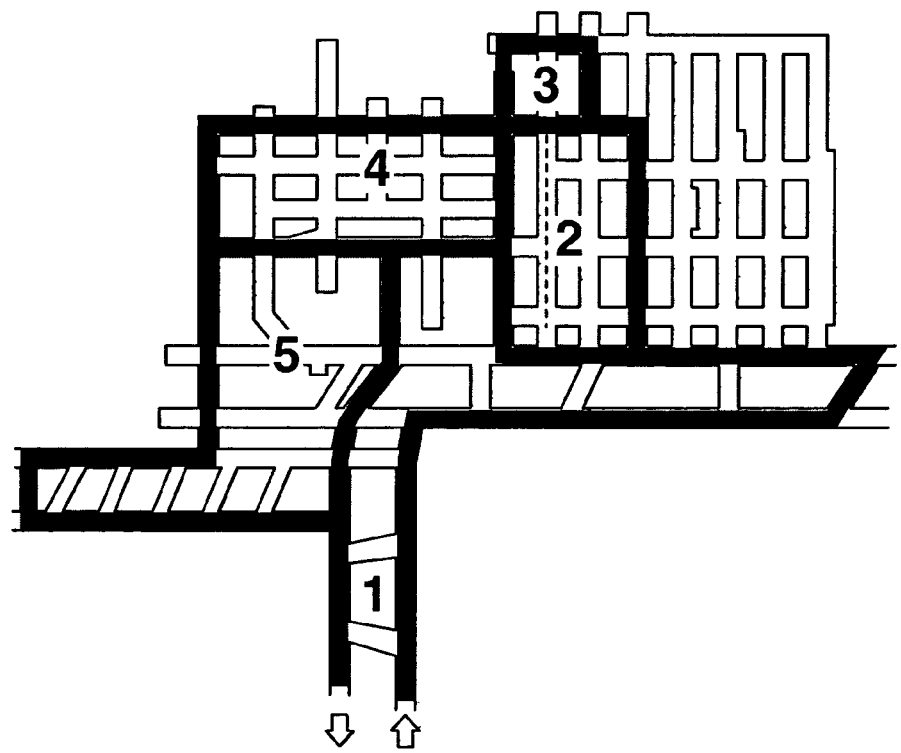
Figure 4D:
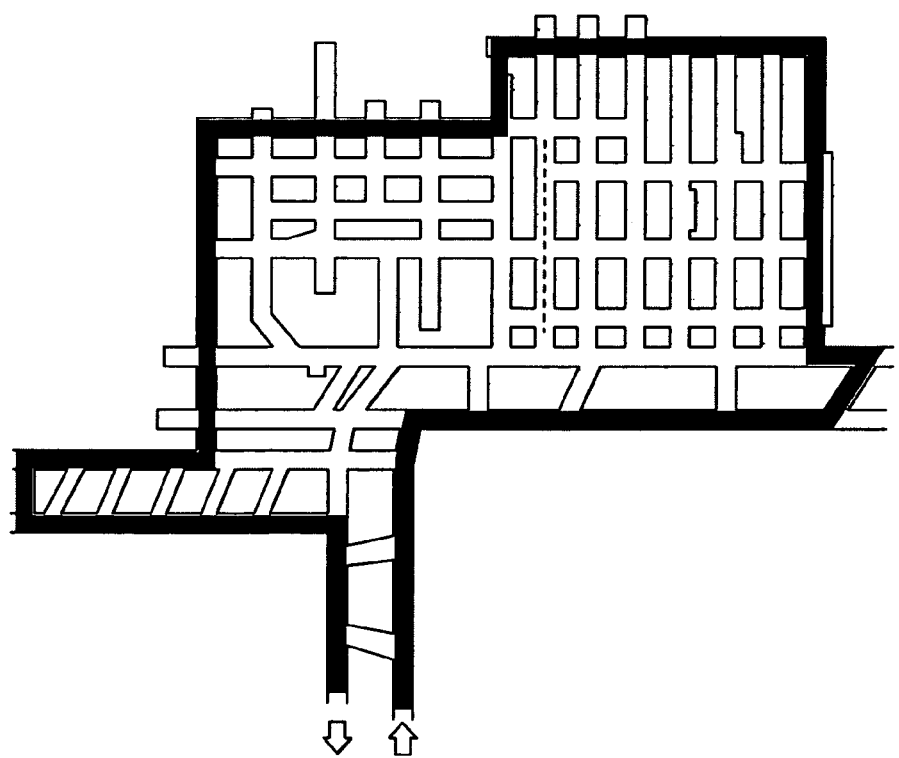

For example, FIG. 4D is a map which corresponds to a sortie guided by operational intent to traverse a corridor without diverging into intersecting corridors (based on prior existing map FIG. 3). The planning, behavior and constraints for corridor traverse cause the robot to track the corridor, ignoring possible opportunities to turn at intersections, and to return without divergence, after mapping the intended corridor.

Perimeter exploration is a convenient plan for searching and following the outer extents of a void. If a prior map exists (FIG. 3), then the operational intent for perimeter following is explicated by formulating an explicit route, with associated behaviors and constraints, during preprocessing. If a prior map does not exist, then the operational intent for perimeter exploration is expressed as a behavior as opposed to an explicit route.

Generally speaking, the very nature of exploration involves encountering and responding to unknowns such as impediments of blockages and opportunities of unanticipated voids. During traverse, the specific robotic response to such a priori unknowns is governed by the operational intent.

Conveyance of Payloads other than Void Modeling Sensors

Payloads other than void modeling sensors 22 provide a means of logging and correlating environmental data while mapping in order to generate environmental models within the void. Payload devices other than void model sensors also encompass means for deploying devices such as cameras, gas analyzers, water analyzers and ore assay samplers, and actions associated with said devices. Logging serves to provide a better understanding of the subterranean void characteristics.

Egress

Egress 24 is the means by which robots exit subterranean voids. Self-mobile robots egress by either driving out of voids or by re-docking to a base station for stowage, followed by a retrieval. Robots with imposed mobility may need to stow before they can egress. Docked and positioned robots are typically retrieved by hoisting or pulling through the opening into the void. Docking is the means by which a robot attaches itself back to the base station. Stowing is the means by which a robot configures itself into a compacted configuration for recovery. There may be several dockings prior to egress where data is downloaded, the robot is recharged, and new mapping mission is initiated.

Post Processing

Post processing 26 includes the means for centrally gathering range and motion data to correlate observations from multiple views and refine geometric models with a priori models of subterranean voids. Post processing begins with the uploading of data to a central processor following mapping operations. Robot data models are transformed to a local or global coordinate reference system to create a common frame of reference for analysis. During post processing, multiple models are analyzed together with previous data in order to correlate and draw conclusions about the void space. Derivative models and drawings are created from data in order to convey the information to others.

As seen in FIG. 1, these multiple void mapping steps may be repeated by one or more robots (typically before post processing 26) in subsequent "sorties" 28.

The above discussion sets forth the major procedural steps that are addressed by the mapping robots of the present invention. However, different void environments present different unique challenges that are all addressed within the scope of the present invention. Therefore, the various embodiments and features of mapping robots described herein should be viewed as a collection of interchangeable parts—each of which may be combined or interchanged in a countless variety of orientations. Eight (8) general classes of robots are initially explained via Table 1, and this brief introduction is then followed by an extensive discussion of various mapping robot orientations, features and optional accessories to be used to address the different problems encountered in each of the eight classes of robots.

TABLE 1

|  | Void Entry Restriction | Void Amenability To Robot Motion | Void Content |
| --- | --- | --- | --- |
| 1.1.1 | Non-Transformable | Self Mobile | Gas |
| 1.1.2 | Non-Transformable | Self Mobile | Liquid |
| 1.2.1 | Non-Transformable | Imposed Mobility | Gas |
| 1.2.2 | Non-Transformable | Imposed Mobility | Liquid |
| 2.1.1 | Transformable | Self Mobile | Gas |
| 2.1.2 | Transformable | Self Mobile | Liquid |
| 2.2.1 | Transformable | Imposed Mobility | Gas |
| 2.2.2 | Transformable | Imposed Mobility | Liquid |

Exemplary Robots

There are many different types of void modeling robots that can be designed and adapted to perform some or all of the void modeling tasks found in FIG. 1. For example, FIG. 2 presents the major components of one exemplary void mapping robot for use in a dry, subterranean environment (e.g., class 1.1.1 above). The void mapping robot 50 preferably includes four matched tires 52 and steering capability 54 used to successfully traverse through the internal features of the void. The void mapping robot 50 also includes fore and aft range sensors (shown as laser range finders 58, 59 with tilting mechanisms 60, 61) used to collect mapping data as well as optional fore and aft cameras 56, 57 for post facto visual registration of void features.

Depending on the environment, the void mapping robot 50 may optionally include one or more gas sensors 62 (to detect and map gas concentrations), sinkage sensors 64, energy storage 66 (shown as batteries), onboard computing 68, and/or wireless communications 70 to optionally send and receive data from the surface. For example, wireless radio communication is useful near portal accesses and base stations, and/or ground penetrating radio (cave radio) which is useful in other locations that are not too deep below the surface. Each of these and other optional accessories are beneficial in one or more of the various different environments in which the void mapping robot 50 may be used, and their use will be discussed in more detail below.

As described above with reference to FIG. 1, there are eight general steps that must be taken into consideration when designing a robot to map the interior surfaces of voids with high resolution. Further, the robots must be tailored to the specific environment in which the robot will operate (as exemplified by the eight different classes of robots). The following description provides details of several exemplary embodiments of actual robot designs that can accommodate one or more of the above void-mapping problems.

To aid in comprehension, an adaptable robot for mapping the interior structures of a mine will be described, but these concepts are easily adaptable to other voids, such as tunnels, pipes, caves and wells, all within the scope of the present invention. Further, the device orientation and feature selection described below should be considered exemplary and optional, respectively, and should not be used to limit the scope of the present invention in any way. One skilled in the art, for example, could easily adapt the rugged mine robot in the first embodiment to one for mapping caves or tunnels which may be at least partially filled with a noxious liquid.

Looking back at FIG. 1, it is shown that the overall robotic void modeling process initiates with a preprocessing step 12. For the exemplary embodiment of robotically mapping a region of a subterranean mine, pre-processing includes analyzing the pre-existing information abut the mine and surrounding areas in order to generate plans detailing: the choice of robot and optional features/sensors; intended ingress/egress points and route; and expectations about void geometry, content, and condition.

This pre-existing information typically includes prior mapping, mining records, production records, coring records, well logs, void evidence from geophysical sensing, visible surface subsidence, known portals, and/or historical and anecdotal evidence. For example, FIG. 3 shows a prior map of a mine intended for robotic mapping. The map contains information such as the notional network of voids, notional dimensions of passages, approximate orientation of internal features, possible portals, and possible elevations. However, these maps are often incomplete, are necessarily dated, and may even be misleading and unreliable.

Further, knowledge of the groundwater table, that is gleaned from well logs, can establish whether a void is likely to be gas-filled or water-filled. Some useful prior maps include water levels yielding an elevation reference and limit of operations within the void. Surface subsidence indicates areas of collapse within the void. Historical knowledge for conditions of floor, roof and pillar can establish expectations for degradation of void conditions. Knowledge of operations in a mine or void can establish expectations for locations of abandoned equipment, haulage rails, explosive atmospheres, and landmarks.

As part of the pre-processing step 12, an intended route for network exploration of a regional perimeter is determined. That route suggests a traverse of a network of grid-like voids after entering a portal. Alternate routes and loops can be pre-generated to circumnavigate the contingencies of barriers that may be encountered. Portals might be designated for ingress and for primary and contingent egress. A simple alternate object would be to circumnavigate the perimeter.

Individual preprocessing decisions are made using all of this pre-existing evidence. These decisions include: determining the objectives of exploration; determining exploration methods; performing ingress and egress assessment; performing a comparison and choice of robot systems; and performing post processing assessment. For example, objectives of exploration can include perimeter mapping of the void, void volume, degradation of conditions assessment, extents of a stabilization project and mineral reserve assessment.

Once the objectives are established, an exploration methodology is chosen. Methodologies typically include perimeter following, corridor following, waypoint goals, network looping and local area investigation. Ingress and egress assessment analyzes the size and condition of available openings into the void and the need to create other accesses. The availability of multiple openings creates the possibility for different ingress and egress points during exploration.

Finally, robot characteristics are compared to determine the system or systems that are appropriate for the investigation. For example, preprocessing operational characteristics for evaluating a robot system include locomotion capabilities, range of operation, sensors, level of autonomy, ingress capabilities, and safeguarding features.

All of the above preprocessing decisions yield a robot plan for exploration. This plan sets forth how the robot systems will be deployed and operated in order to meet the objectives of exploration. The plan includes details on the number of sorties (28) needed to collect the data to meet exploration objectives.

Preprocessing decision-making results in the choice of robot characteristics and features, the ingress point and route with expectations of conditions, pre-planning for contingencies, and egress. FIG. 4A shows a notional plan for a void mapping robot that corresponds to the existing mine map in FIG. 3. The robot plan is to drive into an entry portal 75 of a dry mine to explore a loop of mine corridors before the intention to exit through a different portal 76—one other than the entry portal. Information about seam height from the existing map (FIG. 3) or other sources establishes the expectation that there is sufficient ceiling height for robot passage, and information about the water table suggests that the robot will not encounter deep water (necessitating alternative features or additional robots.

Figure 2A:
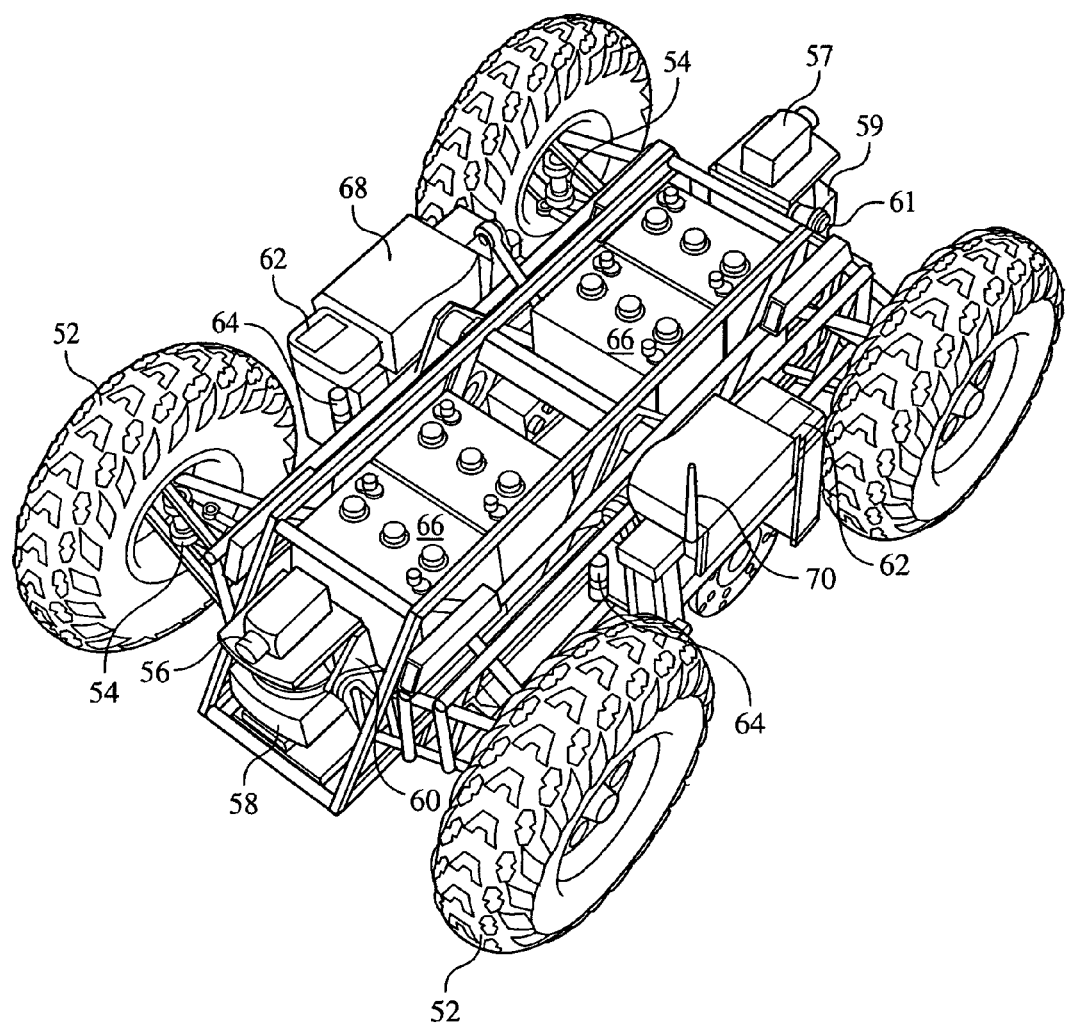
FIG. 2 shows an exemplary void mapping robot including 3D (2A), top (2B), and front (2C) views.
Figure 2B:
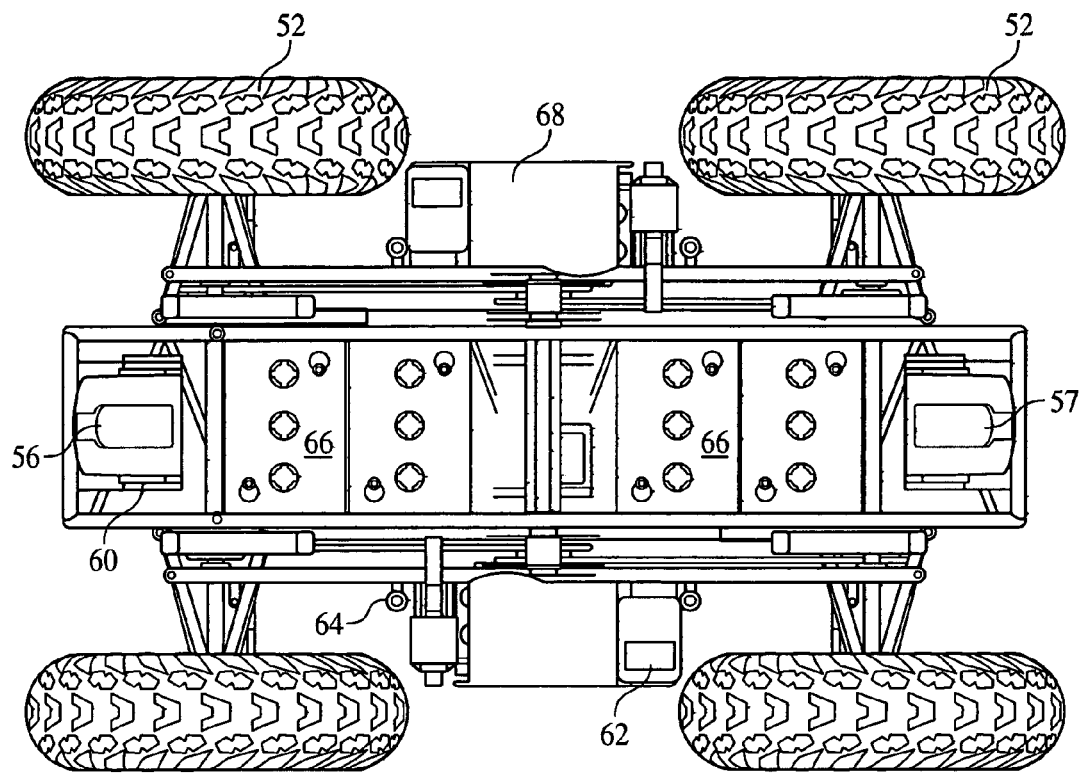
Figure 2C:
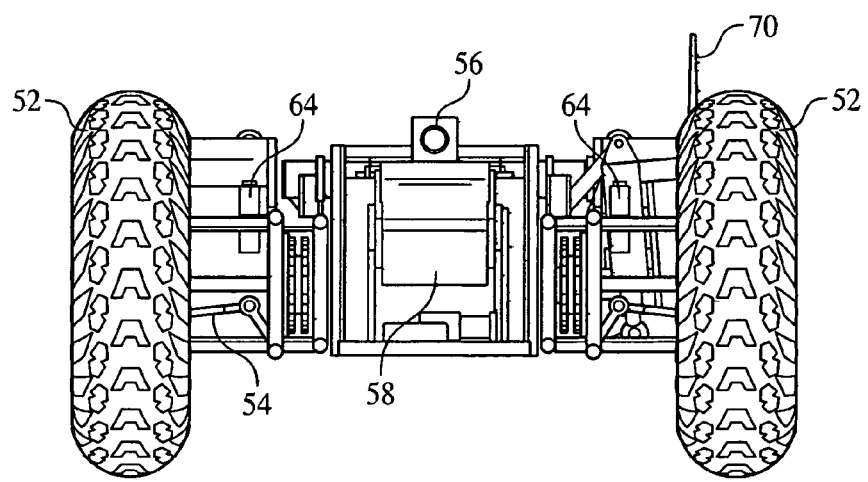

In order to carry out the preprocessing plan, an exemplary embodiment of a void modeling robot 50 is shown in FIG. 2. FIG. 2A shows a 3D view of the void mapping robot, FIG. 2B shows a top view of the robot and FIG. 2C shows a front view of the robot. Generally speaking, the robot is a self-contained, self-reliant, mobile agent with features and capabilities for robotically exploring and modeling subterranean voids. Features include aggressive locomotion for competent robot mobility over and through challenging conditions encountered in voids. Locomotive challenges include fallen rubble, accumulations of mud, residue, and abandoned artifacts. Tight steering 54 enables robot agility for sharp turning in tight passages. The ability to directly negotiate a sharp turn precludes the more complex planning, safeguarding and control that would alternately be required for a multi-point back-and-forth turn that to accomplish a turn using lesser steering capability.

Prime energy storage 66 such as battery, fuel cell or isotopic decay is essential to a self-contained robot, since functions like physical motion, sensing, computing and communication consume power. Range sensing acquires data for generating void models. This embodiment features fore 58 and aft 59 range sensors that are respectively oriented by fore 60 and aft 61 tilt mechanisms. Computing 68 generates local and comprehensive void models, and utilizes these to navigate and explore.

The robotic void modeling of this invention preferably succeeds by processing range data into geometric models that are registered to void boundaries, then generating motion plans and commanding robot motion, while guided by exploration intention. Minimalist robotic void modeling succeeds with range sensing 58 59, computing 68, locomotion and steering 54 that are powered from energy storage 66. Alternate augmented embodiments are enabled by incorporating orientation, odometry and steering feedback information from orientation, odometry and steering sensors. Wireless communication 70 is not generally available for extensive subterranean voids. When available, wireless communication is useful for command, intervention and operational status. Several modes of wireless communication succeed at short range near void portals. Ground penetrating radio succeeds at shallow depth. This embodiment incorporates a short-range, bi-directional wireless serial data link that functions at and slightly beyond line-of-sight. This embodiment conveys gas sensors 62 for evaluating concentrations of explosive gas, sinkage sensors 64 to determine the presence and depth of mud and water, and fore 56 and aft 57 cameras to log a visual record of conditions that the robot encounters during exploration. The gas sensors, sinkage sensors and cameras are payload devices that log information while the robot explores, but their data is not processed by the robot during exploration beyond storing of data.

The various systems related to the void mapping robot are interchangeable to serve different purposes. For mobility, the void mapping robot 50 of FIG. 2 exhibits wheeled locomotion, all-wheel steering and hydraulic actuation (all common in the robot arts). Although wheeled locomotion is shown in this embodiment and is suitable for dry and partially dry mines, crawling, walking and prehensile locomotion are possible alternates within the scope of the present invention. Additionally, in liquid filled voids "swimming" is a means of highly efficient, agile locomotion that is able to maneuver 3-dimensionally and thread small passages.

Figure 13A:
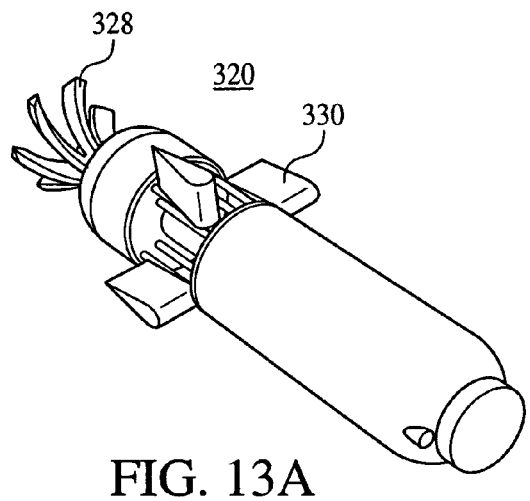
FIG. 13 shows two examples (13A–B and 13C–D) of robots for mapping liquid-filled voids.
Figure 13B:
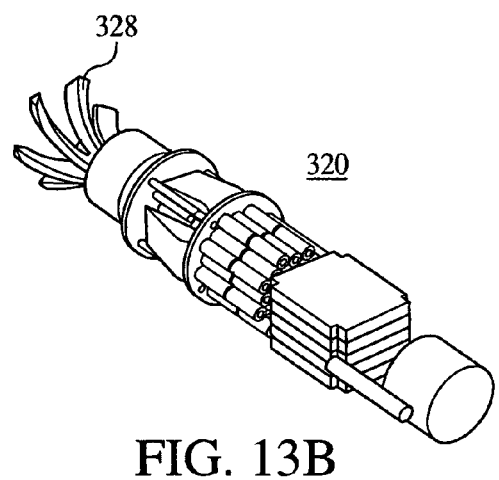

Several swimming embodiments are shown in the figures. For example, FIGS. 13A and 13B depict a torpedo-like submarine void mapping robot 320. A propeller 328 is preferably used for locomotion. Further a set of movable fins 330 are used to steer the torpedo-like robot through the water-filled void. Preferably, these fins 330 are selectively retracted for borehole access and deployed only when the robot enters the void. Fins 330 are only effective when the robot is moving forward. The torpedo-like robot may also include a forward-looking sonar 336 (or other type of sonar) for acquiring mapping data and onboard computing and energy sources (battery).

Figure 13C:
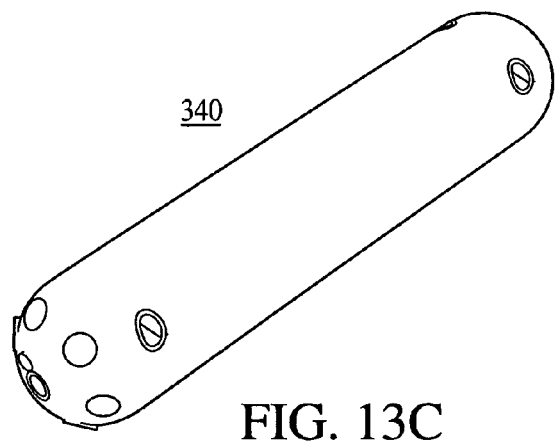
Figure 13D:
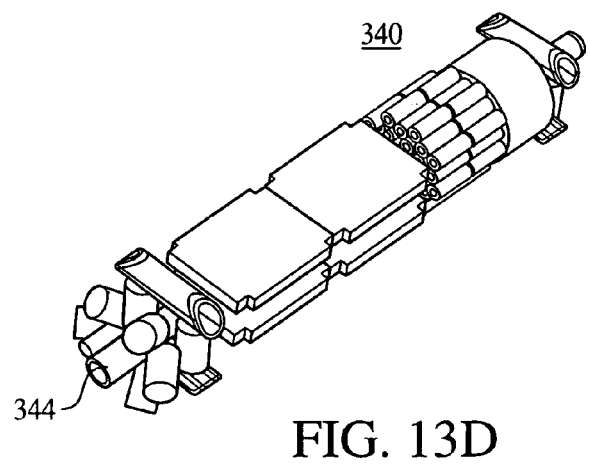

FIGS. 13C and 13D detail an additional swimming embodiment 340 utilizing multiple thrusters 344 that control all axes of position, orientation and motion without the need for longitudinal velocity. Because this robot utilizes momentum transfer and does not require propulsion velocity for thin steering, it is advantageous for methodical and deliberate void exploration. The robot 340 operates in quasi-static mode and is able to maneuver in six axes of motion within the void, enabling strategies of sensing and planning not possible with less general motion.

Figure 16A:
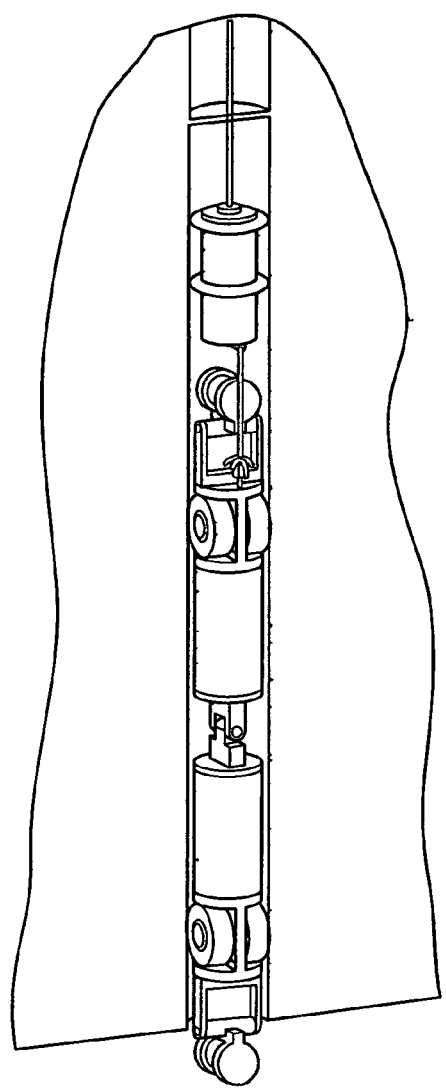
FIG. 16 shows a buoyant robot deployment 16A–16D)
Figure 16B:
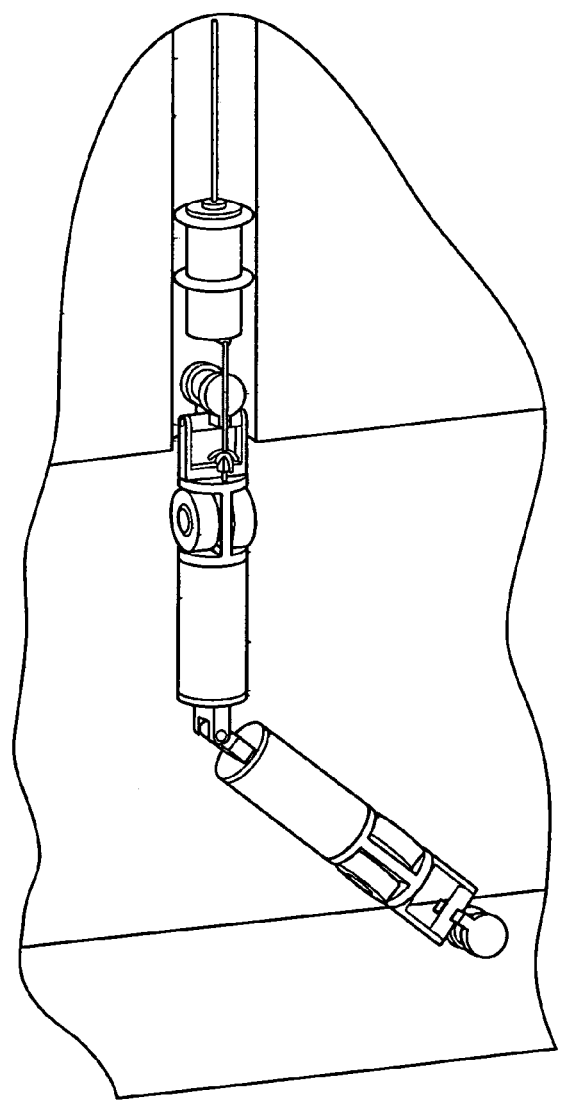
Figure 16C:
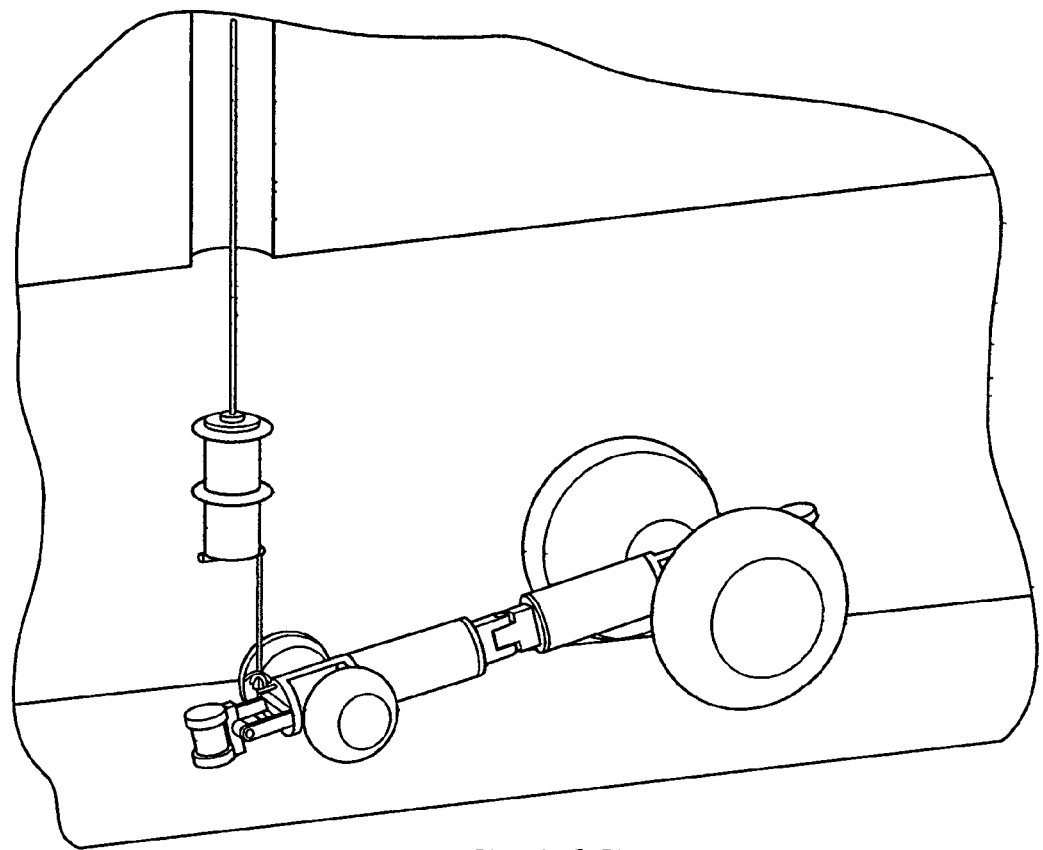
Figure 16D:
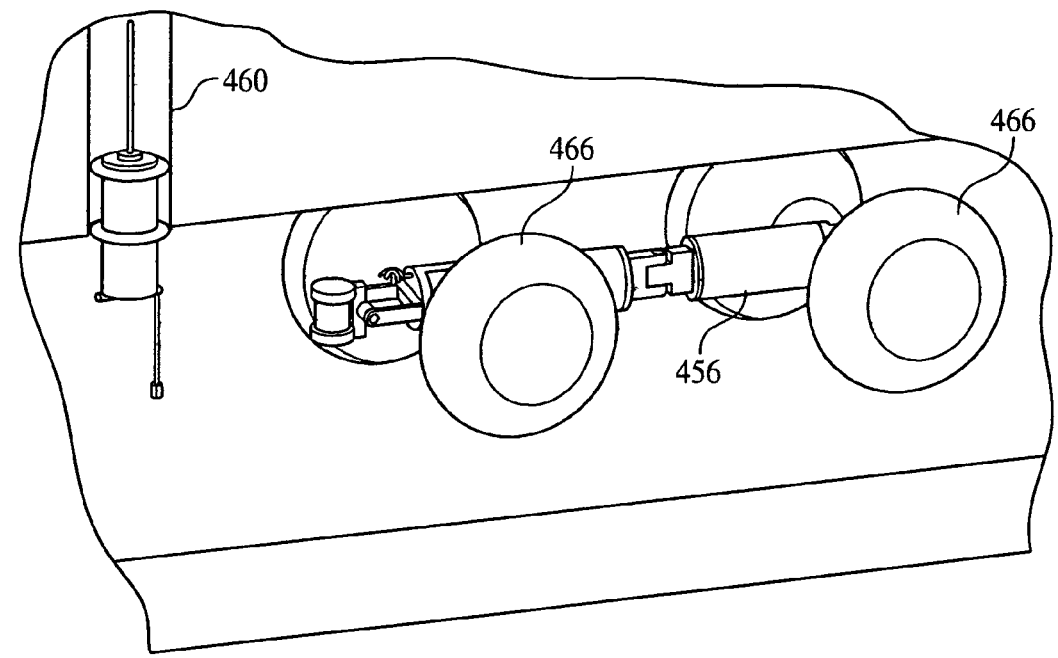

A further alternate means of submerged locomotion is to exploit buoyancy for driving traction along the ceiling of a void. The ceilings of subterranean voids often provide superior surfaces when compared to the floors, as the floors are often littered with rubble and old equipment that occur in some voids. Ceiling locomotion is shown generally in FIG. 16D. There, robot 456 is shown with inflated tires 466 after ingress and deployment through a borehole 460.

It is significant to note that submerged and swimming void modeling robots, as just described, incorporate all of the operational features of their dry counterparts (such as sensing, computing and optional shape-altering transformations), but they may achieve those features by alternate means like pressure sensors to indicate depth that may exploit buoyancy, sonar and hydrodynamic forces and control that are not available to robots operating in gas-filled voids. The swimming versions are available as an alternative form of mobility.

Turning back to the exemplary "dry" void mapping robot 50 of FIG. 2, a tight-radius turning is an enabling feature for maneuvering in the often restricted passages of subterranean voids. Hydraulics (which do not pose a threat of ignition, and are compact, robust and forceful) are a preferred embodiment for actuating many void robots. Hydraulics are appropriate for use when explosive gas conditions are possible—a condition that exists in some subterranean voids. Further, hydraulic actuation is intrinsically impervious to submersion to water, mud and chemical residues commonly encountered in subterranean voids.

In addition to the mobility function, the void mapping robot 50 also includes some type of range sensors for obtaining range measurements from robot to void boundary in order to generate maps of the internal surfaces of a void. As shown in FIG. 2, laser range scanners 58, 59 are optimal sensors for modeling gas-filled voids. Laser scanners determine range utilizing time-of-flight or frequency-modulated-carrier-wave on a laser light carrier medium. Alternatively, radar, sonar, structured light and stereo are alternate means for obtaining range data in various environments. For example, sonar is especially advantageous for submerged voids where laser light is ineffectual.

Because the internal surface of a void is three-dimensional, spot range sensing is preferably scanned to sweep over a region of the internal void surface that is proximate to the robot. The scanning is accomplished by motions that may be integrated into the sensor, such as internal scanning, or by imposed body motions of the sensor (for example, by directing the sensor using a pan-tilt mechanism incorporated into a radial scan that sweeps a planar transect of range data from robot to void boundary. Robot driving motion is an additional means of sweeping a center over a void boundary.

The exemplary embodiment of FIG. 2 utilizes tilt-mounted 60, 61 scanning range sensors 58, 59 both fore and aft of the robot. Tilting enables assessment and utilization of roof-wall and floor conditions, which are not fully observable with fixed sensing. Fore and aft sensing enables exploration and navigation in either direction of operation without requiring turnaround of the robot in confined conditions. Alternatively, the tilt mount could be removed, and/or sensing may only occur at one end of the robot.

If single-ended sensing is used, it is preferable to have a tight turnaround steering 54 option in order to preclude prolonged reversal time in the contingency of exploring a dead-end passage. One capability of the featured robot is an automatic multi-point turn that reverses direction within the robot's length. However, degenerated versions of exploration and modeling may still succeed (2D versus 3D) even without tilt mount and without aft sensing.

In addition to the basic mobility and scanning functions, orientation sensors inertial sensors, steering angle sensors and odometry sensors are optionally incorporated into the void mapping robot to augment the process of motion estimation, robotic positioning and orientation state. Inertial, magnetic and gravitation sensors may be used for this purpose. However, it is notable that the method of sensor-based void modeling invention (including robot position estimation, navigation and autonomy that is implemented here) succeeds in the absence of all these ancillary sensors. This invention succeeds without reliance on traditional sensing for robot ego-motion, since this invention preferably utilizes range sensing to model surrounding void and register position state and robot motion to the geometric void model created by the robot.

In addition to providing a means for generating range data, onboard computing is essential for acquiring the range data, storing the range data as local void models, and processing the range data into composite maps that are the basis for navigating, exploring and modeling extensive subterranean voids. The onboard computing 68 generally requires input/output capability for acquiring sensor data, extensive memory for storing all observed data for post-exploration processing, and processing capability for timely decision-making for navigation and exploration decisions. The computing 68 also commands physical motion, monitors robot state and logs data from conveyed payload sensors. This onboard computing 68 allows some degree of autonomous functionality for the robot.

The void mapping robot 50 may also incorporate wireless communication 70. The wireless communication 70 provides a means for command, control and observation of a void robot 50 and its computing 68 during launching, retrieving and for intervention, should intervention be possible and appropriate in a given circumstance. For example, ground-penetrating radio (cave radio) is a viable means for communicating bidirectionally from robot to ground surface during operations in subterranean voids. Ground-penetrating wireless communication is further useful for localizing robot position by directional detection of the robot's signal from the surface overlying a void.

Alternate communication with a robot may be made through the ingress portal via a tether, but this is restrictive to operational range, route complexity and operational reliability. It is notable that this invention makes communication an optional feature for robotic void modeling, since this invention demonstrates capability for fully autonomous robotic exploration and recovery.

In addition to all of the general systems described above, the void mapping robot 50 may optionally include one or more visual cameras 56, 57, gas analysis sensors 62, and sensors 64 to detect deep sinkage into mud or water. These "payload sensors" (see 22) are distinguished as a class in that they are not incorporated into the robot's estimate of its orientation, position and void modeling capability (the primary functions of the robot). Although not primary, the void mapping robot 50 provides a convenient means to deploy such devices into subterranean voids and provide the significant feature to correlate data and action to location within void models. Hence, it is possible to make visual observations of conditions, perform gas analyses of abandoned mines, and perform direct sampling for ore assay and the like.

These conveyed devices (22) are essential not to the fundamental purpose of robotic void modeling, but to derivative products other than maps. They represent the class of devices that can be hosted aboard the robot to make and report observations, acquire environmental data and effect actions like sample acquisition and guidance of robotic equipment other than passive modeling. Additional payload devices will be recognized by those of skill in the art within the scope of the present invention.

Figure 15A:
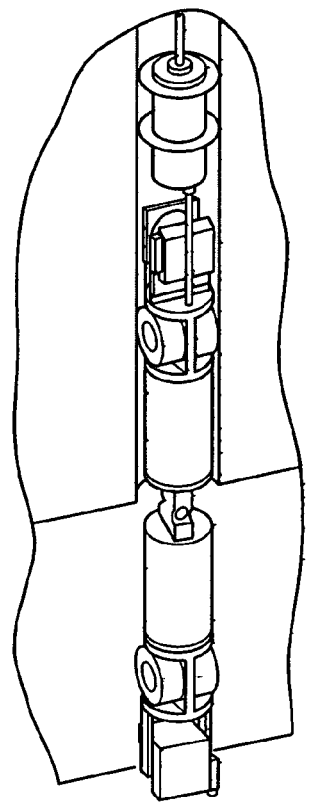
FIG. 15 shows a transformable robot before 15A) and after 15B) deployment.
Figure 15B:
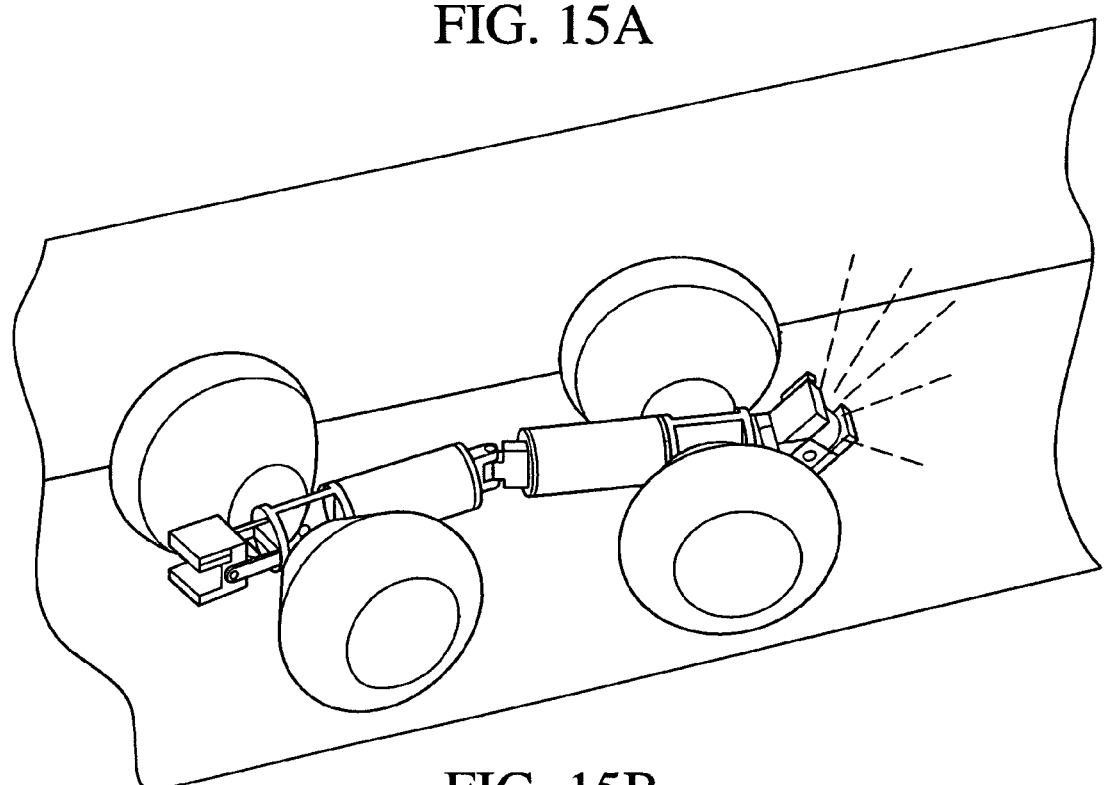

Once all of the preprocessing 12 decisions have been made about robot design and route planning, the void mapping robot actually enters the void (e.g., mine), a step known as ingress 14 (FIG. 1). Robots ingress to access the interior of a void by being activated, operated by command to a void opening, entering the void through the opening and transitioning from ingress to modeling mode. The featured void model robot 50 (FIG. 2) typically drives horizontally into voids (e.g., through a mine portal). However, if a vertical or inclined opening exists that is too steep for driving access, then the void mapping robot may be deployed by a hoist or conveyed into the void by loading or towing equipment (see, e.g., FIG. 17). Alternate ingress 14 for floating or submerged robots is to launch, then to propel and submerge. Ingress for amphibious robots FIG. 15 (a combination of wet and dry propulsion means) can involve driving into a dry portal, then transitioning to wade and launch when water is encountered. The amphibious robots may also be ingressed via vertical borehole (FIG. 15a) in a stowed orientation.

Generally speaking, the robotic capabilities for ingress 14 are characterized by the size of the robot relative to the size of the void opening, obstacle capability, ground clearance, traction, and ground pressure enabling negotiation of slope, debris, loose material and soft floor. Gas or liquid void content determines whether a robot swims into a void. In the exemplary scenario for exploration of a region of a mine, the scenario for ingress is to drive the robot into an entry portal as designated in Class 1.1.1.

Once inside (or partially inside) a void, the void mapping robot creates a local void model by deploying a range measuring sensor that is scanned or contacted over a portion of the void boundary proximate to the robot to acquire range data. As briefly described above, gas-filled voids are amenable to sensors such as lidar, sonar, stereo imaging, light striping, tactile and inductive sensors. Liquid filled voids are preferentially amenable to sonar sensors and tactile sensors.

The robot shown in FIG. 2 utilizes a forward laser scanner 58 for producing a local void model while advancing and utilizes an aft laser scanner 59 when reversing. This scanning orientation is useful for occasions when void restriction precludes turnaround, and where blockage conditions (e.g., fallen timber) prevent advance. The laser scanners 58, 59 embodied on this robot 50 gather data in a radial manner over a 180 degree transverse plane that centers on the robot's longitudinal axis. Hence, each data scan transects a half-plane of void geometry that radiates forward and lateral of the scanner. When the scanner's forward tilt 56 is aligned with the horizontal axis of the robot, then local void models are two-dimensional, planar transects of the void. When these horizontal models are combined using the forthcoming method of this invention, then the successive scans composite into two-dimensional models of subterranean voids, and robot position is determined in those two dimensions.

The scanners 58, 59 on this robot can, additionally or alternatively, be oriented by tilting mechanisms 60, 61. By this means, the robot can transect planes of the void boundary that incline upward and downward as well as horizontally forward. A sweep of tilt angles gathers a sector of range data that covers a portion of a spherically-projected region proximate to the robot. This data represents a three-dimensional local model of a portion of the void boundary (generally shown in FIGS. 14A–14C). Three-dimensional local void models can be composited into comprehensive three-dimensional models (generally shown in FIG. 14D) of subterranean voids (typically during post processing).

In order to map more than a small area within a void, the void mapping robot must somehow reposition itself within the void (by movement or replacement in successive locations). Specifically, the robot explores and maps unknown voids by interleaving a cycle of local void modeling, incorporation of this local information into a comprehensive void model, planning, and motion. With sufficient computing power, it is possible to scan, model and navigate at a rate that exhibits continuous motion to the outside observer. The exploration can be accomplished in 2D, 3D, or a combination thereof. This function constitutes the related process steps of void modeling 16, mapping and navigation 18, and exploration 20 (from FIG. 1).

An exemplary embodiment alternates frequent, short phases of motion guided by 2D range scans, acquired from horizontal laser scans, with occasional phases in which the vehicle stops to acquire full 3D range scans by assembling many 2D scans while tilting the scanner axis. An analysis of the 3D scans leads to a path that is then executed, again using rapidly acquired 2D scans to determine the robot's motion relative to the 3D map. If no such path is found, then high-level control software adjusts the motion direction accordingly.

In a preferred embodiment, the invention relies on efficient statistical techniques for generating such maps in real-time. The method employs a fast scan-matching algorithm for registering successive scans, thereby determining robot position and motion without reliance on traditional odometry sensors. More specifically, the present invention determines robot location and governs robot motion by building and utilizing models of the void boundary rather than reliance on odometry such as wheel-counting. Odometry and direct sensing of robot orientation and physical motion can be incorporated in robot void modeling, but is not essential. Groups of scans are then converted into local maps, using Markov random fields to characterize the residual path uncertainty.

Loop closure is attained by adding constraints into those Markov random fields based on a maximum likelihood estimator. When closing back on a prior path after navigating in a loop, it is possible for an exploration robot to make bad judgement of whether and where it is meeting the former path. That is exacerbated, since local regions of many voids and many intersections look alike to robot sensors. The vulnerability of the maximum likelihood approach to making poor judgement about closing a loop is overcome by a data association mechanism that can undo and redo past associations so as to maximize the overall map consistency. Hence, if it is discovered through ongoing exploration that a prior assumption about looping or networking was flawed, then it is possible for this invention to alter that assumption to best fit overall evidence.

To navigate, local 3D scans are mapped into terrain maps of surfaces such as floors, walls and ceilings, by analyzing surface gradients and vertical clearance in the 3D scans. The result is subsequently transformed into cost functions expressed in the robot's three-dimensional configuration space, by convolving the surface terrain maps with kernels that describe the robot's footprints in different orientations. Fast A-star planning is then employed in configuration space to generate paths executed through proportional-differential control. It is understood that alternate planning schemes such as D-star and alternate control schemes such proportional-integral-differential control are also viable for this invention.

Figure 12:
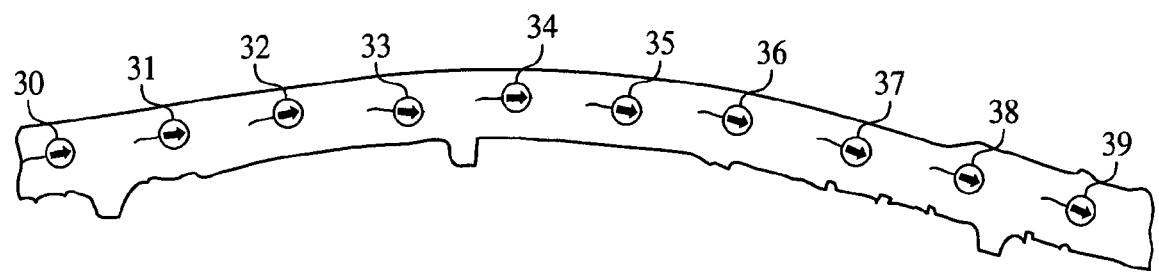
FIG. 12 shows a 2D map of a robot sortie.
Figure 14D:
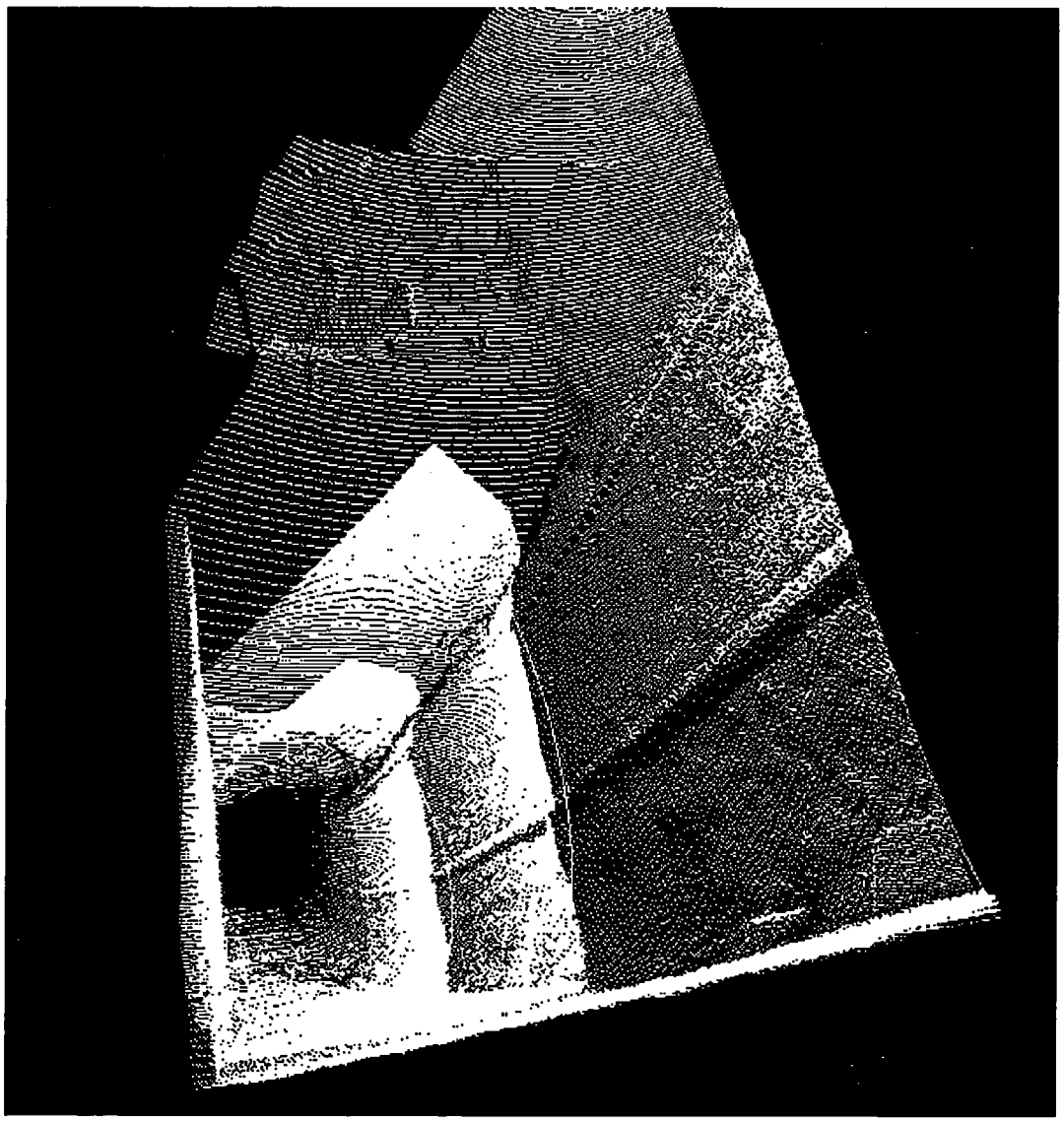

The exploratory void modeling process can be used to generate consistent large-scale maps. FIG. 12 details an exemplary 2D map generated by a void mapping robot traversing a mine. The numbered circles represent successive locations at which the void mapping robot collected full 3D scan data, and the arrows indicate robot orientation during these 3D scans. The lines between successive stops indicate the path of the void mapping robot, and the side boundaries indicate the 2D void map with detail regarding wall geometry and intersecting corridors. Again, each individual 3D scan (FIGS. 14A–14C) can be combined into a composite image (FIG. 14D).

The generated maps can be geo-referenced to geodetic coordinates by initializing the process before entering a void and after exiting a void, when it is possible to correlate both geodetic and robotic map-estimated positions. It is further possible to register to features in underground voids such as known coordinates of boreholes, airshafts, survey marks or processing equipment that a robot may encounter while exploring. Use of the previously-known information should be maximized in this way.

The exemplary system is preferably used in subterranean voids as part of fully autonomous exploration, by fully self-guided robots beyond the reach of radio communication and possible human access or retrieval. Based on the extensive preprocessing and intelligent decision-making algorithms, the void mapping robot may be able to map extensive underground voids without interaction with the "outside" world.

The combined means of void modeling 16, navigation 18 and exploration 20 (FIG. 1) can be guided by software that governs operational intent. For example, one operation is guided by the operational intent to traverse a corridor without diverging into intersecting corridors (based on prior existing map FIG. 3). Alternatively, perimeter exploration is a convenient plan for searching and following the outer extents of a void. If a prior map exists (FIG. 3), then the operational intent for perimeter following is explicated by formulating an explicit route during preprocessing. If a prior map does not exist, then the operational intent for perimeter exploration is expressed as a behavior as opposed to an explicit route. FIG. 4D illustrates a plan for perimeter exploration.

Likewise, portal to portal traverse 108 is an exploration plan that takes advantage of exploring areas of a void using separate locations for ingress 75 and egress 76 (e.g., FIG. 4A). Because this strategy does not require a return to the point of ingress it allows greater efficiencies in exploration.

When the operational intent is interior exploration of a networked void (i.e., interconnected passages), an exploration sortie may require looping that traverses a void region more than once. Note that the route expressed in FIG. 4C cannot be subtended without a robot closing loops 1 110, 2 116, 3 118, 4 120 and 5 122. The benefit of looping is that repeated traverses can improve the confidence and quality of a resulting model, but repeated traverse of a sector consumes stored power and hence limits the net distance that can be covered in a sortie. Multiple sorties (process step 28 in FIG. 1) are appropriate when an exploration exceeds the capacity of a single operation. The described method is capable of incorporating and resolving looped routes.

Generally speaking, the very nature of exploration involves encountering and responding to the unknown. A simple route as depicted in FIG. 4A may be specified as a preplanned route. During traverse, an uncharted (not on prior map FIG. 3) blockage 112 might be encountered as depicted in FIG. 4B. It is then necessary for the void mapping robot to plan a detour route 114 to circumnavigate the blockage 112 and rejoin the intended route (at 115). Although diverse re-plan options are possible, and the robot will examine many, in extreme instances of blockage, the last resort is to egress by retracing the path of ingress. The more comprehensive the prior information about the void is, the more options the robot has in re-planning its course, on-the-fly.

Figure 6:
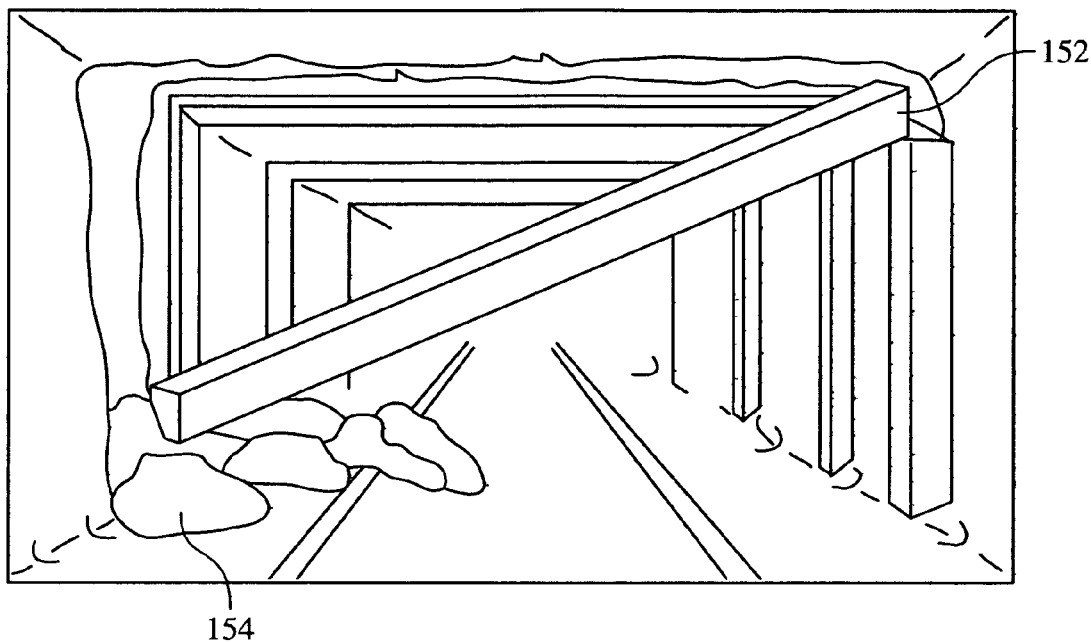
FIG. 6 is a visual representation of a mine corridor.
Figure 7:
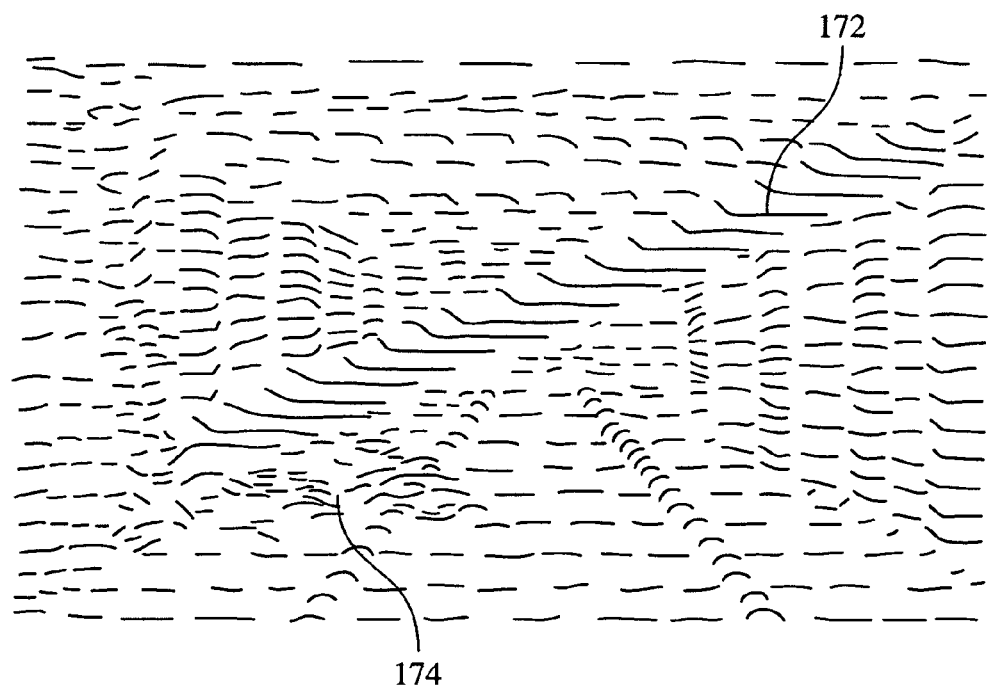
FIG. 7 shows a scanned representation of a mine corridor.

Encountering blockages provides a way to develop a more accurate map, going forward. For example, FIG. 7 represents a local void model that a robot might determine as a blockage that initiates route re-planning for a detour route. Although this is a specific example of a fallen timber 172 and rubble 174, the depicted blockage is representative of diverse conditions that can occur from roof-fall, abandoned equipment, backfill and many contingencies. FIG. 7 is a representation of the actual condition that constituted the blockage. Information of the type in FIG. 7 can be recovered from the robot's stored range data following exploration. Information of the type in FIG. 6 which also shows the fallen timber 152 and rubble 154 can be recovered from camera imagery conveyed aboard the robot, and viewed following exploration. Such data, models and imagery are invaluable information about circumstances and conditions observed during robotic exploration, but which are otherwise unobservable. All of this information is available for different purposes during post processing.

After one or more mapping circuits are undertaken or completed, the void mapping robot is ready to be removed from the interior of the void (egress 24). In some embodiments, egress 24 consists only of the robot wheeling or motoring out of the egress portal 76 of the mine. However, in some cases, as described in more detail below, egress 24 also includes some type of stowing that counters the result of the deployment step during ingress 14. For example, some sensors, or even the robot itself, may be folded or deflated (e.g., FIG. 15) into the interior portions of the robot body. Further, a mobile mapping robot may be re-docked with a docking station for removal from the void. Thereafter, either under its own power, or by being pulled from an external source, the void mapping robot preferably leaves the inside of the void and is accessible at the surface for post processing 26. Additional sorties may ingress 14 and egress 24 through the same access, but explore different regions via different routes.

After collecting all of the required data and leaving the void, the robot enters the post processing step 26. Therein, refined void models and derivative products can be generated by processing the collected void data beyond the extent that is necessary for robots to enter, explore and exit a void. Additional computing power not found on the robot itself is typically used for this purpose.

Figure 5:
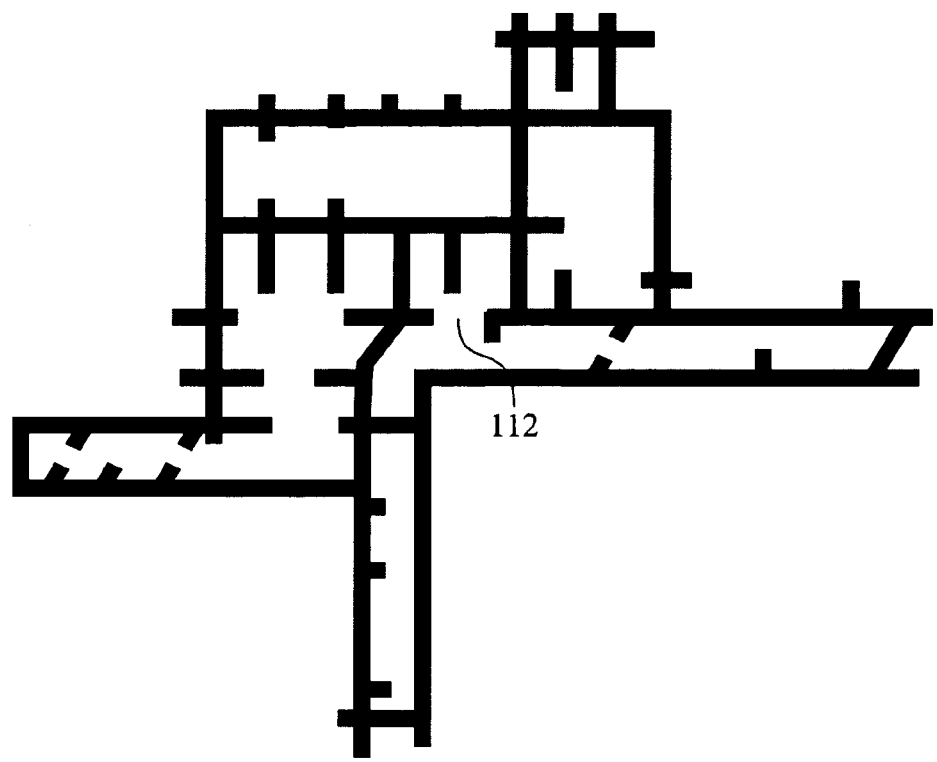
FIG. 5 shows a computer composite map.

As an example of post processing, FIG. 5 composites the maps of several exploration sorties into a single, high resolution, comprehensive map. Based on the robot plan defined in FIG. 4C, a first robot sortie could traverse loops 1, 2 and 3 and another could traverse loops 1, 4 and 5. The methods utilized to navigate these loops can also be employed during post processing to join the resulting sub-maps into the combined map of FIG. 5 that encompasses loops 1, 2, 3, 4 and 5. Note that the composite map of FIG. 5 corresponds significantly to the pre-map that was available before exploration (FIG. 3). Notable exceptions include the blockage 112 and many details that differ between the prior map and the void model observed during exploration. These additional details include additional excavation located beyond what was on the prior map.

As a matter of practicality, robotic void modeling customarily computes with only a fraction of the 3D data that is acquired during exploration. It is common to store the majority of data for post-exploration review, and for post processing to create refined models and derivative products. Post processing can compute to exploit the entirety of 3D local void data that is not viable for processing during exploratory mapping. Use of complete data and application of rigorous algorithms can post-process 3D void models that exhibit the highest quality of geometric fidelity, which is not necessary for real-time locomotion.

Figure 10:
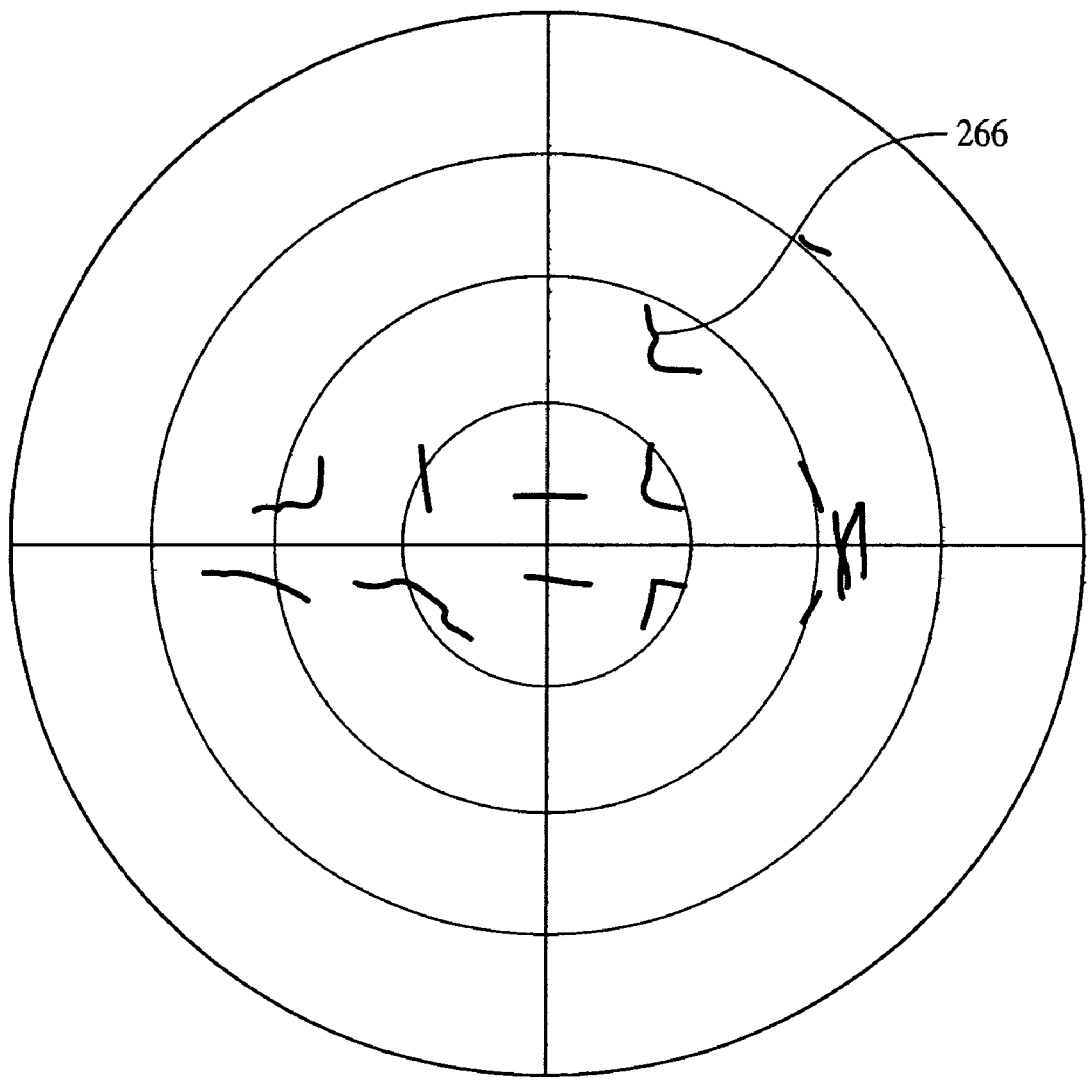
FIG. 10 shows sonar data collection.
Figure 11:
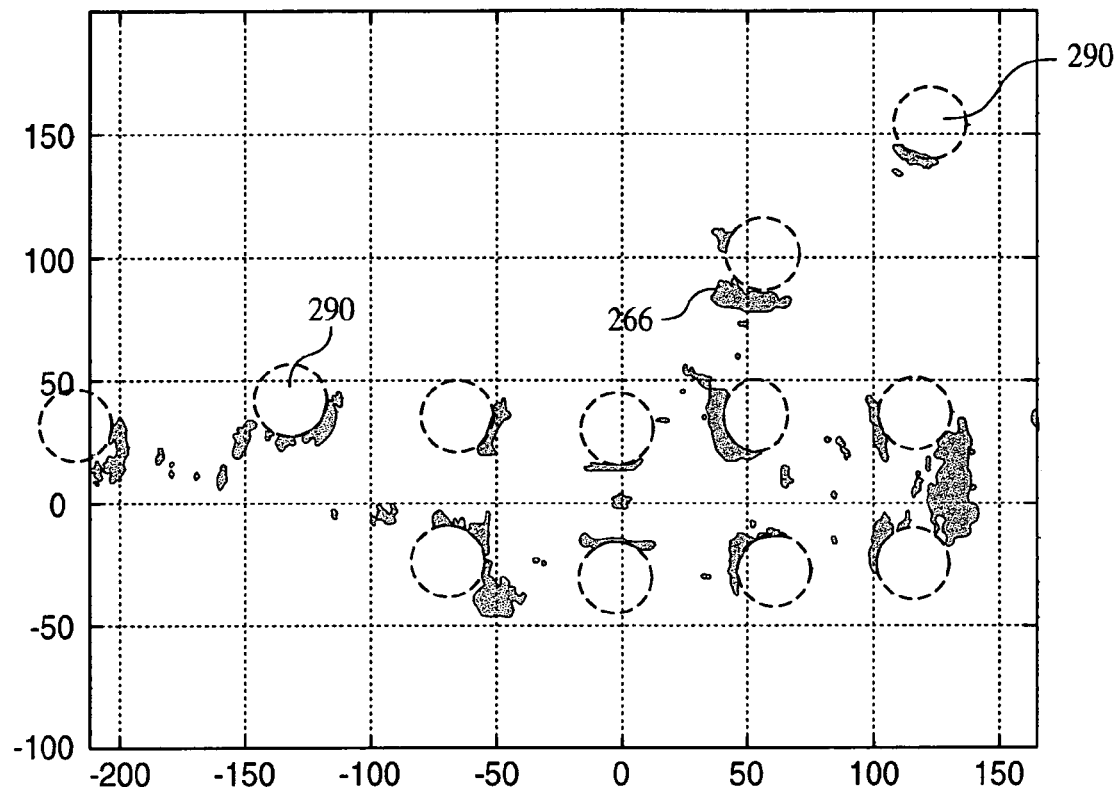
FIG. 11 shows a map with sonar data incorporated therein.

As with preprocessing, post processing can further incorporate domain knowledge with observed void data. For example, when knowledge of mining technique is combined with void data, a mine model such as FIG. 11 results. Sonar range data 266 of an extensive water-filled void is represented as collected in FIG. 10. The data was gathered by sensing from a single borehole, and no other access was possible from which to obtain other data or perspectives. No prior mine map existed, but historical knowledge recalled rounded, hard rock pillars 290 of an approximate diameter in certain locations. Combining this historical knowledge with the range data results in FIG. 10, results in the more complete post processed map of FIG. 11.

Post processing can also generate derived engineering products like section drawings and void volume calculations that are common in the commercial trade. A significant post processing capability includes registration of void coordinates to survey standards like GPS or state plane coordinates.

Another significant post processing capability of the present invention is the capability to register location and orientation of a pre-existing map to geodetic coordinates. For example, a common dilemma with an old map of an abandoned void is that the precise location and orientation of the map may not be known relative to surface coordinates. The overarching principle is to utilize robotic means of ingress/egress such as portal(s) and borehole(s), combined with surface survey techniques that determine position and interrelate one or more portal(s) and borehole(s) to co-register the surface and subterranean surveys and pose them in common, global coordinates. This is akin to the method of human mine survey that closes a traverse that is partially underground, then loops to the surface via ventilation shafts, portals or boreholes. It is notable that the computational means for extending void models from subterranean regions to and through surface loops are identical to those means invented and presented elsewhere in this application for modeling subterranean voids that loop or are multiply connected.

Still another significant post processing capability of this invention is the capability to register the location and orientation of a pre-existing map to surface coordinates without robotically subtending a traverse from portal to portal or from borehole to borehole through the void. The robot need only "peek" into the void at point locations, then correlate these points to the pre-existing map and the points to each other through surface survey means (see generally FIG. 17). The pre-existing map can be used as geometric evidence to represent the subterranean geometry. The technique will translate and rotate the map to the best fit. The principle of closing the survey loop from surface to subterranean via access still pertains, but the map fills some of the subterranean gaps in the loop. The robot portion of the loop can be borehole sorties and/or portal sorties that only generate local models of viewable void. Registration of the map to surface coordinates occurs by fitting local features observed by the robot to local features in the pre-existing map. Since the survey relationship of the access points (locations of boreholes and portals) are known, these interrelate the geometry of multiple local models. The individual local void models then become a constellation of related local void models, which further fit and register an old map to surface coordinates.

An exemplary embodiment would drill three boreholes into the subject void and utilize the robots and methods of this invention (described elsewhere) to generate local void models through these boreholes. A surface survey determines the triangular relationship of the three boreholes, and hence the composite geometric model of three related voids (not necessarily visible from one another) that fit in some manner to the pre-existing map.

The composite void model data is then mathematically superimposed on the mine map. The match proceeds by maximizing the fit of boundaries in the void model with boundaries of the pre-existing map. The fit then maximizes empty regions of the robotic void model with empty regions in the pre-existing map. The fit then minimizes empty regions in the robotic void model that would pass through pillars and walls (which is not physically possible). The fit then adjusts the void model with pre-existing map and surface survey data until statistical quality of fit is achieved. The resulting configuration yields an estimate of position and orientation of the pre-existing map to surveyed surface coordinates. The method also yields the statistics of the fit, which can serve as a measure of confidence for the estimated map position and orientation.

Transforming Robot Embodiment

A small robot size is an advantage for entering voids via small accesses such as boreholes, fissures, vents and chimneys. Larger size robots are advantageous for locomotion, bearing components and deploying sensors. The dilemma to be both small and large simultaneously is addressed by a class of "transforming" void mapping robots that compact for ingress, expand for operations (deployment), and then compact again (stow) for egress.

Figure 8:
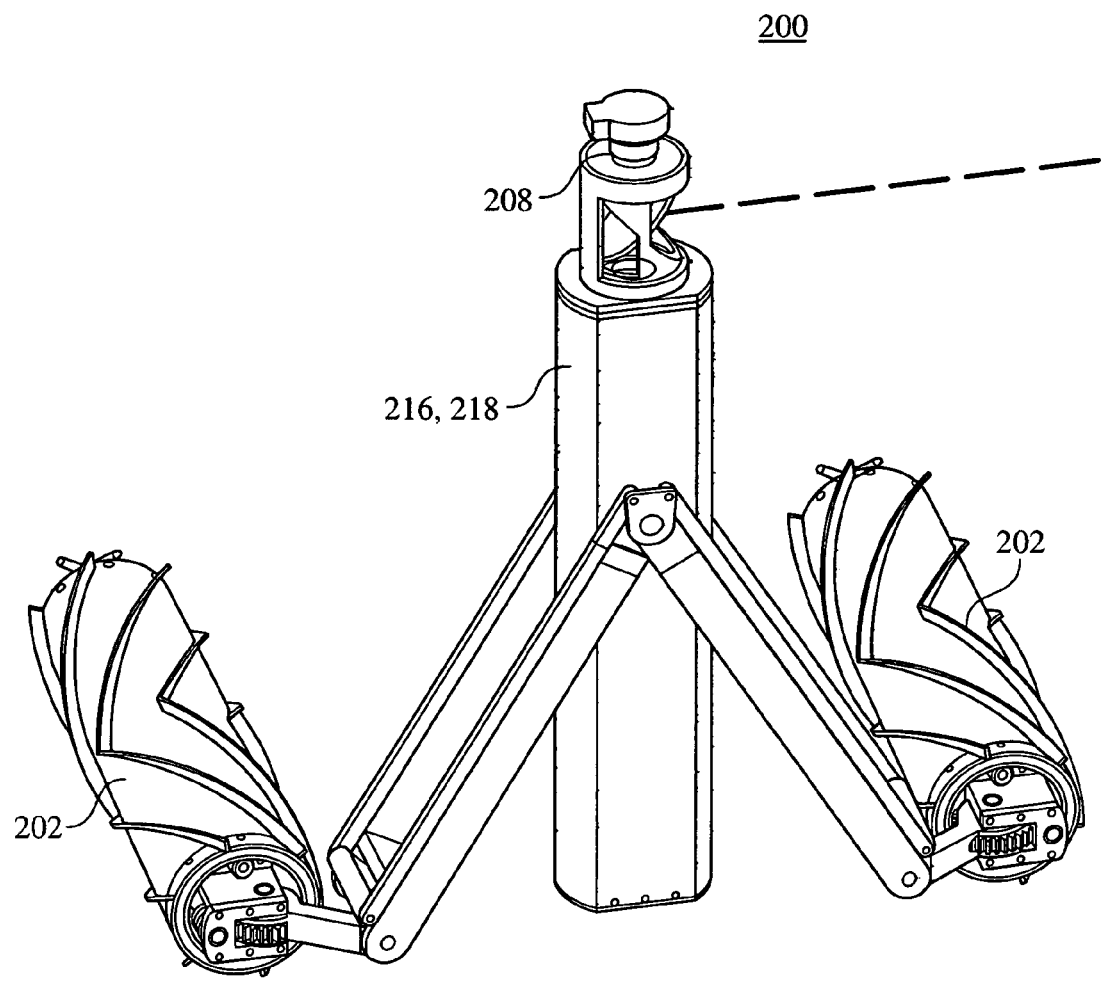
FIG. 8 shows an exemplary transformable robot.
Figure 9A:
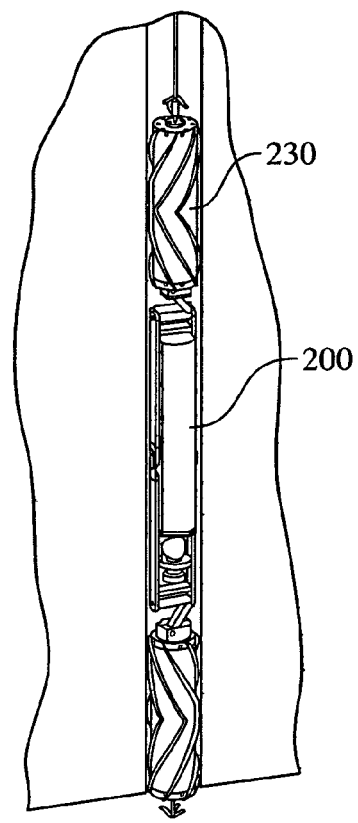
FIG. 9 shows the deployment of a transformable robot from borehole insertion (9A), through partial ingress (9B), to full ingress (9C), to deployment (9D)
Figure 9B:
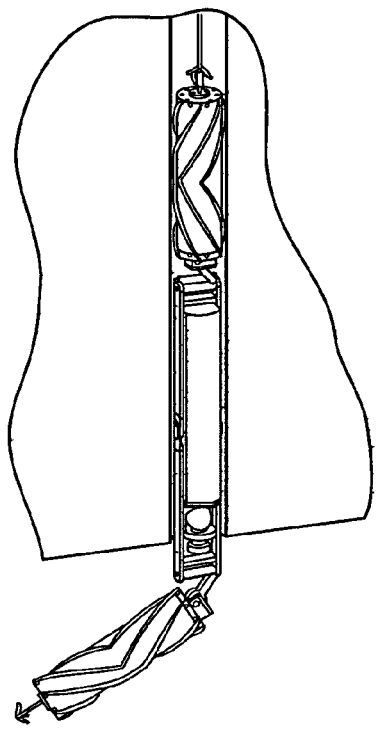
Figure 9C:
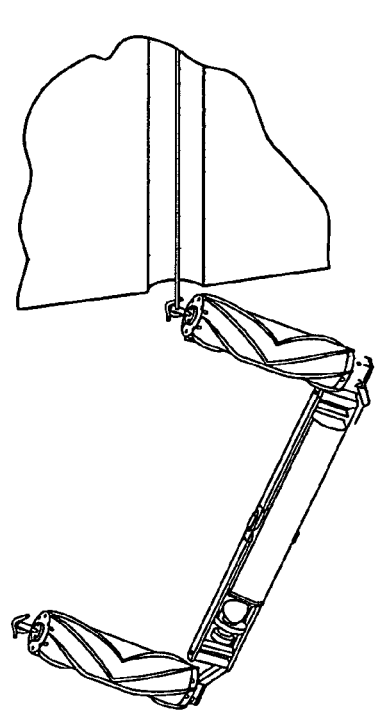
Figure 9D:
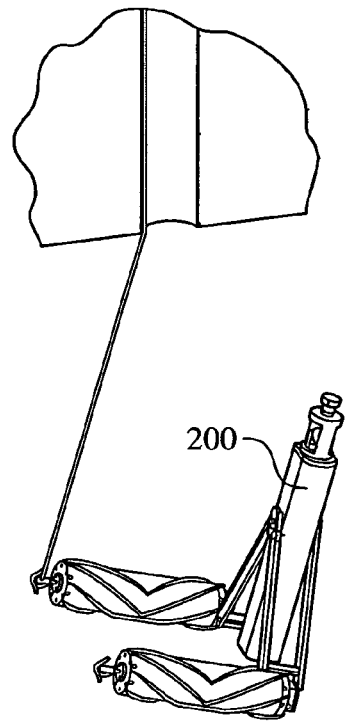

FIG. 8 illustrates a preferred transforming robot 200 for void modeling, and FIGS. 9A–9D show the deployment of the transforming robot. This exemplary embodiment exhibits means for locomotion 202, steering, power storage 218, computing 216, odometry and range sensor scanning 208, and the large physical dimensions that are advantageous for self-mobile void modeling. The distinction is that this robot can transform to a thin, long, cylindrical shape 230 that is able to ingress and egress voids via small-diameter boreholes and other small portals. FIGS. 9A–9D show a sequence of action for this transforming robot to begin from cylindrical form 230 (FIG. 9A), lower via borehole, and incrementally unfold and lower (FIGS. 9B–9C) to result in a fully-functional void modeling capability (FIG. 9O). The unfolding process is reversed to egress the void through the borehole.

Alternate manifestations of transforming void robots include the inflatable configuration represented in compact (FIG. 15A) and deployed (FIG. 15B) state. A further advantage of inflatable designs are the capacity to inflate with gas, fluid, or a combination thereof, and hence to govern buoyancy and traction that enable bottom crawling or ceiling-crawling (see, FIGS. 16A–D). Note that these transforming robots incorporate all the features for exploratory modeling of voids plus the ability to enter and exit via small openings.

Figure 17:
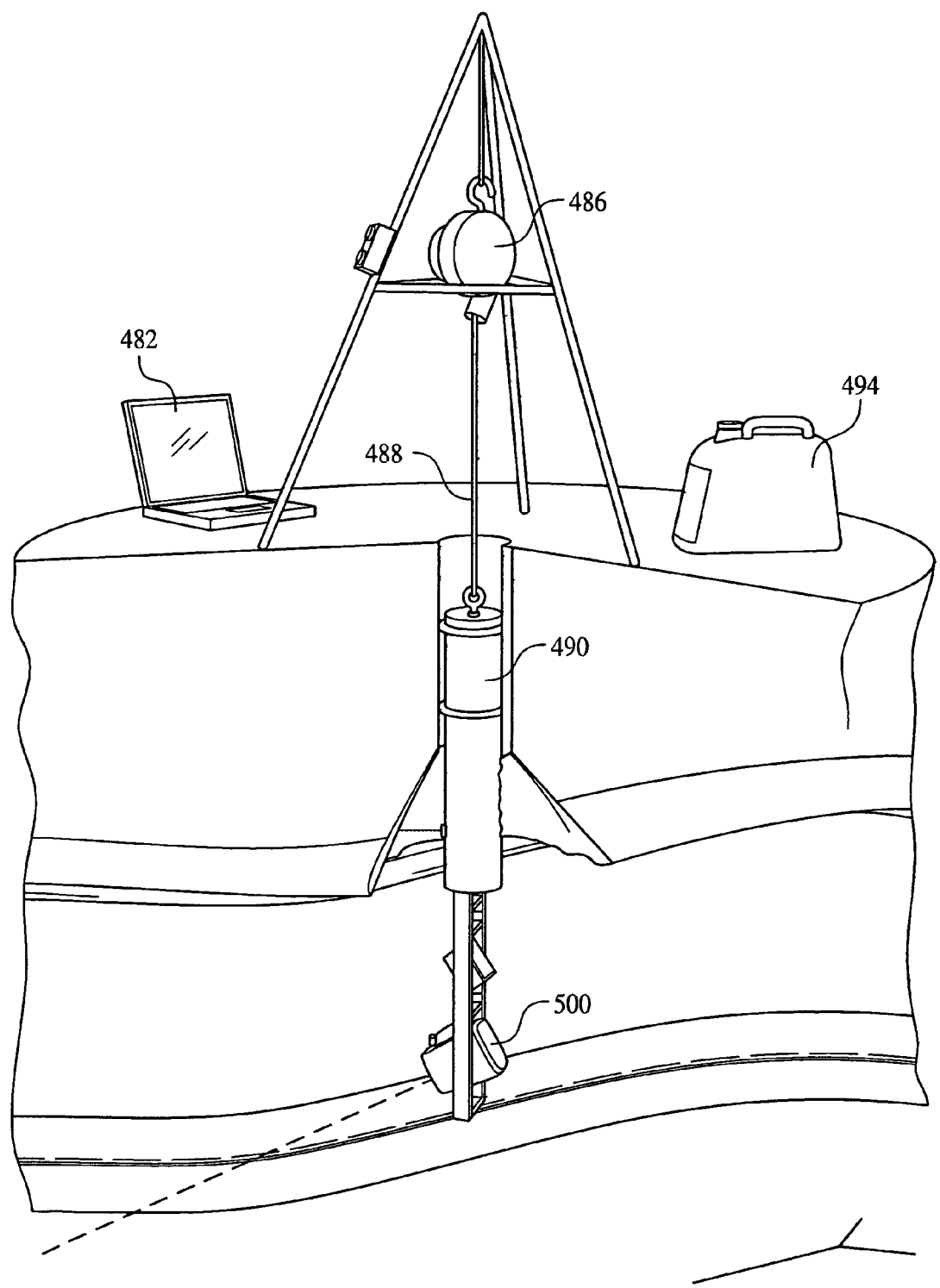
FIG. 17 shows a void mapping robot scanning from a position partially within a void.

An important class of void may not be amenable to self-mobile robot exploration due to access, content or locomotive difficulty. An exemplary embodiment for this class of void are robots and sensors that are deployed and moved within a void by imposed mobility (FIG. 17). This refers to lowering, rotating or indexing a void modeling robot within a void by cable, strut or appendage that induces motion other than the driving, swimming, crawling, walking and hopping that characterize self-mobile robots. Alternate means for imposing motion is to brace or anchor from a borehole, fissure or portal, then to deploy and move a robot or sensors into a void via relative motion from the brace or anchorage.

FIG. 17 illustrates an exemplary embodiment of an imposed mobility void modeling device. Features of this embodiment include a base station outside of the void with an energy source 494, deployment mechanism 486, and computer 482. The computer 482 serves as the command console and talks to the computer on the robot through the tether 488. The computer 482 is the data storage. The robot preferably includes a tether 488, stabilizer 490, range sensor 500, short range sensor, camera, pan and tilt.

An exemplary void modeling scenario is to lower the device into a void through a borehole by tether 488. The side looking short range sensor indicates when the robot has entered a void. The stabilizers grip the borehole for stability. The void modeling sequence described previously in this patent application pertains to this class of self-mobile robots in all regards except for means of imposing motion. The motion sequence is commonly a series of prescribed advancements that protrude into the void (for example, cable increments), with local void models produced at each advancement, typical of the previously described method for self-mobile void modeling. The pose estimation, composite modeling, navigation and post processing proceed as described elsewhere in this patent.

This is distinguished from traditional borehole modeling such as range scanning from a single perspective or from visual camera imaging, which are minimalist degenerations of the methods and devices invented here. An alternate embodiment utilizes scanning sonar, and is advantageous for modeling liquid-filled voids.

A significant innovation is to slightly cant the plane of the scanning sensor relative to the borehole axis, then to rotate the canted device about the borehole axis. The effect is to scan the local void model in a cylindrical "Vee" pattern as opposed to a radical disk pattern. The radial disk is a degeneration of the cylindrical Vee, when the scanner angle is uncanted. This results in the sensing of substantial void boundary surface from each location that is occupied by imposed mobility. This further results in maximum void visibility from the limited void that is common at a borehole.

A portion of void ceiling commonly collapses and the rubble accumulates on the void floor in a cone pattern when a borehole drill breaches a void. This restricts the height of a void at the critical region of borehole access. This is particularly critical when a void is initially shallow at the location of borehole entry. The shallow void height is locally diminished by the height of the rubble cone. In this instance the feature of "Vee" scanning is significant.

Although the technology disclosed herein has been described as useful for exploration of mines, it will be appreciated that it could find use not only for robotic cave survey but also for cave exploration, sewer mapping, barrier reef science, and searching through rubble (for example the rubble of collapsed buildings). It will also be appreciated that although examples of locomotion given herein include rolling and propeller-induced swimming, other means of locomotion such as crawling, walking, flying, or hopping are also possible and envisioned by the inventors, as is a robot's ability to transform its configuration so as to enable such means of locomotion as well as to safeguard against tip-over, collision, entrapment, or other calamity, all in accordance with means well known in the art and science of robotics.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method for mapping an interior surface of a subterranean void, comprising the steps of:
    inserting an autonomous void mapping robot at least partially into an interior portion of the subterranean void;
    capturing local range data describing the interior surface of the subterranean void at a position proximate to said void mapping robot;
    incorporating said captured local range data into a full data map of the interior surface of said subterranean void;
    moving said void mapping robot to a second local position within the subterranean void, the route to said second position calculated by the autonomous void mapping robot based on an analysis of the full map data including the captured local range data;
    capturing second local range data describing the interior surface of the subterranean void at a position proximate to said void mapping robot; and
    incorporating said captured second local range data into the full data map.

2. The method of claim 1, wherein said inserting step is comprised of the steps of stowing the void mapping robot before insertion, moving the void mapping robot into the interior portion of the subterranean void, and deploying the void mapping robot within the subterranean void.

3. The method of claim 2, wherein said stowing is accomplished by deflating part of the void mapping robot, and said deploying is accomplished by inflating part of the void mapping robot.

4. The method of claim 2, wherein said stowing is accomplished by folding at least part of the void mapping robot into an interior portion of the void mapping robot, and said deploying is accomplished by unfolding at least part of the void mapping robot out of the interior portion of the void mapping robot.

5. The method of claim 1, wherein, at insertion, the void mapping robot includes a mobile mapping robot docked to a docking station.

6. The method of claim 1, wherein said captured local range data is two dimensional and said full data map is three dimensional.

7. The method of claim 1, further comprising the step of:
    continuously acquiring, during said moving step, additional low resolution scans that are used to confirm that the robot is moving according to the calculated second position.

8. The method of claim 7, wherein the route to said second position is constrained to follow route guidelines selected from the group consisting of a perimeter-finding algorithm, a route-following algorithm and a corridor traverse algorithm.

9. The method of claim 1, wherein said movement and calculation is performed autonomously by the void mapping robot.

10. The method of claim 1, wherein said movement is accomplished by removal through a first borehole and insertion in a second borehole.

11. The method of claim 1, further comprising the step of: egressing from the void.

12. The method of claim 11, further comprising the step of:
    after egressing, post processing the full map data into an additional map of the void in greater resolution than the full map data.

13. The method of claim 11, further comprising the steps of:
    capturing additional sensor data not related to the internal surface of the void; and
    after egressing, post processing the full map data and the additional sensor data into a void map with additional data.

14. A method for mapping interior surfaces of a void, comprising the steps of:
    storing existing data about the interior surfaces of the void;
    ingressing an autonomous void mapping robot into said void;
    determining a mode of exploration based on said existing data;
    determining an initial mobility plan based on said existing data and said mode of exploration;
    modeling at least a local area of said interior surfaces of the void proximate the void mapping robot using two dimensional range finding scans;
    utilizing additional sensors to gather environmental information about the interior of the void not related to navigation;
    autonomously updating said mobility plan on board the void mapping robot based on the model of said local area; and
    egressing the void mapping robot out of said void.

15. A robot for mapping the internal surface of a void, comprising:
    means for moving the robot within the void;
    range data collection means for collecting local mapping data about the void by determining the distance from a point in the internal surface of the void to the robot;
    means for incorporating said local mapping data into an overall void map on board said robot; and
    means on board said robot for utilizing said local mapping data to calculate movement of the robot through the void by the means for moving the robot.

16. The void mapping robot of claim 15, wherein said mobility means includes swim fins and a propeller.

17. The void mapping robot of claim 15, wherein said mobility means includes tires.

18. The void mapping robot of claim 15, wherein said range data collection means includes a sonar sensor for use in liquid-filled voids.

19. The void mapping robot of claim 15, wherein said range data collection means includes a laser range finder.

20. The void mapping robot of claim 15, further comprising:
    means for sweeping said range data collection means in multiple axes to collect a volume of local mapping data.

21. The method of claim 1, further comprising the steps of:
    autonomously generating a topological map of said void space; and
    autonomously navigating the void based on said topological map.

* * * * *